United States Patent
Amano et al.

(10) Patent No.: US 9,986,579 B2
(45) Date of Patent: May 29, 2018

(54) SPLIT MIRACAST TRANSMISSION OVER MULTIPLE FREQUENCY BANDS

(71) Applicant: SONY CORPORATION, Tokyo (JP)

(72) Inventors: Sho Amano, Tokyo (JP); Hideki Iwami, Saitama (JP); Osamu Yoshimura, Kanagawa (JP); Natsuki Itaya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 112 days.

(21) Appl. No.: 15/023,847

(22) PCT Filed: Jun. 24, 2014

(86) PCT No.: PCT/JP2014/066612
§ 371 (c)(1),
(2) Date: Mar. 22, 2016

(87) PCT Pub. No.: WO2015/045525
PCT Pub. Date: Apr. 2, 2015

(65) Prior Publication Data
US 2016/0219606 A1 Jul. 28, 2016

(30) Foreign Application Priority Data
Sep. 30, 2013 (JP) .................. 2013-205609

(51) Int. Cl.
*H04W 72/10* (2009.01)
*H04N 1/00* (2006.01)
(Continued)

(52) U.S. Cl.
CPC ........ *H04W 72/10* (2013.01); *H04N 1/00217* (2013.01); *H04N 21/2385* (2013.01);
(Continued)

(58) Field of Classification Search
CPC ... H04W 72/10; H04W 76/025; H04W 16/14; H04N 1/00217; H04N 21/2385; H04N 21/26216; H04N 21/43637; H04B 7/0689
See application file for complete search history.

(56) References Cited

U.S. PATENT DOCUMENTS

| 2013/0293689 A1* | 11/2013 | Fleck ................ H04W 52/0274 348/54 |
| 2014/0120829 A1* | 5/2014 | Bhamidipati .... H04N 21/42207 455/3.06 |
| 2016/0027399 A1* | 1/2016 | Wilde .................. G06F 13/382 345/520 |

FOREIGN PATENT DOCUMENTS

| JP | 2004-528764 A | 9/2004 |
| JP | 2008-278388 A | 11/2008 |

(Continued)

OTHER PUBLICATIONS

Network Working Group; RFC2326 (RTSP); Apr. 1998.*

*Primary Examiner* — Ricky Ngo
*Assistant Examiner* — Stephen Steiner
(74) *Attorney, Agent, or Firm* — Oblon, McClelland, Maier & Neustadt, L.L.P.

(57) ABSTRACT

In order to perform an appropriate data transmission control, an information processing apparatus performs data transmission by using at least one of a wireless transmission channel of a high frequency band and a wireless transmission channel of a low frequency band, and performs real time image transmission with another information processing apparatus in accordance with a Wi-Fi certified miracast specification. Also, the information processing apparatus includes a control unit. This control unit executes a control to transmit a control signal relevant to Wi-Fi certified (Continued)

miracast to the other information processing apparatus by using the wireless transmission channel of the low frequency band.

18 Claims, 20 Drawing Sheets

(51) Int. Cl.
  *H04N 21/2385* (2011.01)
  *H04N 21/262* (2011.01)
  *H04N 21/4363* (2011.01)
  *H04W 84/12* (2009.01)
  *H04M 1/725* (2006.01)

(52) U.S. Cl.
  CPC . *H04N 21/26216* (2013.01); *H04N 21/43637* (2013.01); *H04M 1/7253* (2013.01); *H04M 1/72533* (2013.01); *H04M 2250/06* (2013.01); *H04N 2201/0055* (2013.01); *H04W 84/12* (2013.01)

(56) References Cited

FOREIGN PATENT DOCUMENTS

| | | |
|---|---|---|
| JP | 2013-183378 A | 9/2013 |
| WO | 2012/094507 A2 | 7/2012 |

\* cited by examiner

FIG. 9

| IDENTIFICATION CODE | ELEMENT EXAMPLE |
|---|---|
| A | MAXIMUM TRANSMISSION SPEED (TRANSMITTER DEVICE SIDE) |
| B | MAXIMUM TRANSMISSION SPEED (RECEIVER DEVICE SIDE) |
| C | AVERAGE TRANSMISSION SPEED (TRANSMITTER DEVICE SIDE) |
| D | AVERAGE TRANSMISSION SPEED (RECEIVER DEVICE SIDE) |
| E | PACKET ERROR RATE (PER) |
| F | BIT ERROR RATE (BER) |
| G | CHARACTERISTIC OF DATA DEFECT (RANDOM OR CONTINUOUS) |
| H | NUMBER OF TIMES OF DATA RETRANSMISSION |
| I | TRANSMISSION DELAY (LATENCY) |
| J | FLUCTUATION OF TRANSMISSION TIME (JITTER) |
| K | RECEPTION SIGNAL INTENSITY OF RECEIVER DEVICE (RECEIVED SIGNAL STRENGTH INDICATION (RSSI)) |
| L | SIGNAL TO INTERFERENCE PLUS NOISE RATIO (SINR) |

FIG. 10

|   | A | B | C | D | E | F | G | H | I | J | K | L |
|---|---|---|---|---|---|---|---|---|---|---|---|---|
| IMAGE TRANSMISSION | ◎ | ◎ | ◎ | ◎ | ○ | ○ | — | — | ○ | ○ | — | — |
| SOUND TRANSMISSION | — | — | ○ | ○ | ◎ | ◎ | ○ | — | ◎ | ○ | — | — |
| CONTROL SIGNAL TRANSMISSION | — | — | — | — | ○ | ○ | ◎ | — | — | — | — | — |

<u>a</u>

|   | A | B | C | D | E | F | G | H | I | J | K | L |
|---|---|---|---|---|---|---|---|---|---|---|---|---|
| 802.11ad | HIGH | HIGH | HIGH | HIGH | HIGH | HIGH | CONTINUOUS | SMALL | SMALL | SMALL | — | — |
| 802.11n (5GHz) | MIDIUM | MIDIUM | MIDIUM | MIDIUM | LOW | LOW | RANDOM | MIDIUM | MIDIUM | MIDIUM | — | — |
| 802.11n (2.4GHz) | LOW | LOW | LOW | LOW | MIDIUM | MIDIUM | RANDOM | HIGH | HIGH | HIGH | — | — |

MESSAGE CHANGE EXAMPLE 1 WHEN CONTROLLING MULTIPLE TRANSMITTED DATA ON ONE RTSP SESSION

CHANGE EXAMPLE 1 OF M3 RESPONSE MESSAGE

```
RTSP/1.0 200 OK
CSeq: 1
Content-Length: 314
Content-Type: text/parameters wfd_video_formats: 00 00 01 01 00000001 00000000 00000000 00 0000 0000 00 none none
wfd_audio_codecs: LPCM 00000003 00                501
wfd_3d_video_formats: none
wfd_content_protection: HDCP2.1 port=12345 12346
wfd_display_edid: none                       502   503
wfd_coupled_sink: none
wfd_client_rtp_ports: RTP/AVP/UDP;unicast 1028 1030 0 0 mode=play
``` a

CHANGE EXAMPLE 1 OF M4 REQUEST MESSAGE

```
SET_PARAMETER rtsp://localhost/wfd1.0 RTSP/1.0
CSeq: 2
Content-Type: text/parameters
Content-Length: 254 wfd_video_formats: 00 00 01 01 00000001 00000000 00000000 00 0000 0000 00 none none
wfd_audio_codecs: LPCM 00000002 00
wfd_presentation_URL: rtsp://10.82.24.140/wfd1.0/streamid=0 none
wfd_client_rtp_ports: RTP/AVP/UDP;unicast 1028 1030 0 0 mode=play
                                          504  b  505
```

CHANGE EXAMPLE 1 OF M6 REQUEST MESSAGE

```
SETUP rtsp://10.82.24.140/wfd1.0/streamid=0 RTSP/1.0     506
CSeq: 1
Transport: RTP/AVP/UDP;unicast;client_port=1028-1029 1030-1031
``` c

CHANGE EXAMPLE 1 OF M6 RESPONSE MESSAGE

```
RTSP/1.0 200 OK
CSeq: 1                                                  507              508
Session: 6B8B4567;timeout=30
Transport: RTP/AVP/UDP;unicast;client_port=1028-1029 1030-1031;server_port=5000-5001 5002-5003
``` d

FIG. 14
MESSAGE CHANGE EXAMPLE 2 WHEN CONTROLLING MULTIPLE TRANSMITTED DATA ON ONE RTSP SESSIONN

CHANGE EXAMPLE 2 OF M3 RESPONSE MESSAGE

```
RTSP/1.0 200 OK
CSeq: 1
Content-Length: 405
Content-Type: text/parameters wfd_video_formats: 00 00 01 01 00000001 00000000 00000000 00 0000 0000 00 none none
wfd_audio_codecs: LPCM 00000003 00
wfd_3d_video_formats: none
wfd_content_protection: HDCP2.1 port=12345
wfd_content_protection: HDCP2.1 port=12346    ~ 511
wfd_display_edid: none
wfd_coupled_sink: none
wfd_client_rtp_ports: RTP/AVP/UDP;unicast 1028 0 mode=play
wfd_client_rtp_ports: RTP/AVP/UDP;unicast 1030 0 mode=play    ~ 512
``` a

CHANGE EXAMPLE 2 OF M4 REQUEST MESSAGE

```
SET_PARAMETER rtsp://localhost/wfd1.0 RTSP/1.0
CSeq: 2
Content-Type: text/parameters
Content-Length: 307 wfd_video_formats: 00 00 01 01 00000001 00000000 00000000 00 0000 0000 00 none none
wfd_audio_codecs: LPCM 00000002 00
wfd_presentation_URL: rtsp://10.82.24.140/wfd1.0/streamid=0 none
wfd_client_rtp_ports: RTP/AVP/UDP;unicast 1028 0 mode=play
wfd_client_rtp_ports: RTP/AVP/UDP;unicast 1030 0 mode=play    ~ 513
``` b

CHANGE EXAMPLE 2 OF M6 REQUEST MESSAGE

```
SETUP rtsp://10.82.24.140/wfd1.0/streamid=0 RTSP/1.0
CSeq: 1
Transport: RTP/AVP/UDP;unicast;client_port=1028-1029
Transport: RTP/AVP/UDP;unicast;client_port=1030-1031    ~ 514
``` c

CHANGE EXAMPLE 2 OF M6 RESPONSE MESSAGE

```
RTSP/1.0 200 OK
CSeq: 1
Session: 6B8B4567;timeout=30
Transport: RTP/AVP/UDP;unicast;client_port=1028-1029;server_port=5000-5001
Transport: RTP/AVP/UDP;unicast;client_port=1030-1031;server_port=5002-5003    ~ 515
``` d

SEQUENCE CHART EXAMPLE WHEN CONTROLLING MULTIPLE TRANSMITTED DATA ON ONE RTSP SESSION

FIG. 17

MESSAGE CHANGE EXAMPLE WHEN USING DIFFERENT URLs FOR RESPECTIVE RTSP SESSIONS

CHANGE EXAMPLE OF M4 REQUEST MESSAGE

```
SET_PARAMETER rtsp://localhost/wfd1.0 RTSP/1.0
CSeq: 2
Content-Type: text/parameters
Content-Length: 392 wfd_video_formats: 00 00 01 01 00000001 00000000 00000000 00 0000 0000 00 none none
wfd_audio_codecs: LPCM 00000002 00                                              ~521
wfd_presentation_URL: rtsp://10.82.24.140/wfd1.0/streamid=0&link=11ac none
wfd_presentation_URL: rtsp://10.82.24.140/wfd1.0/streamid=0&link=11n none  ~522
wfd_client_rtp_ports: RTP/AVP/UDP;unicast 1028 0 mode=play
wfd_client_rtp_ports: RTP/AVP/UDP;unicast 1030 0 mode=play  ~523
``` a

CHANGE EXAMPLE OF TWO M6 REQUEST MESSAGES

```
SETUP rtsp://10.82.24.140/wfd1.0/streamid=0&link=11ac RTSP/1.0
CSeq: 1                                                    ~524
Transport: RTP/AVP/UDP;unicast;client_port=1028-1029
```

```
SETUP rtsp://10.82.24.140/wfd1.0/streamid=0&link=11n RTSP/1.0
CSeq: 2                                                   ~525
Transport: RTP/AVP/UDP;unicast;client_port=1030-1031
``` b

CHANGE EXAMPLE OF TWO M7 REQUEST MESSAGES

```
PLAY rtsp://10.82.24.140/wfd1.0/streamid=0&link=11ac RTSP/1.0
CSeq: 3                                                  ~526
Session: 6B8B4567
```

```
PLAY rtsp://10.82.24.140/wfd1.0/streamid=0&link=11n RTSP/1.0
CSeq: 4                                                 ~527
Session: 6B8B4567
``` c

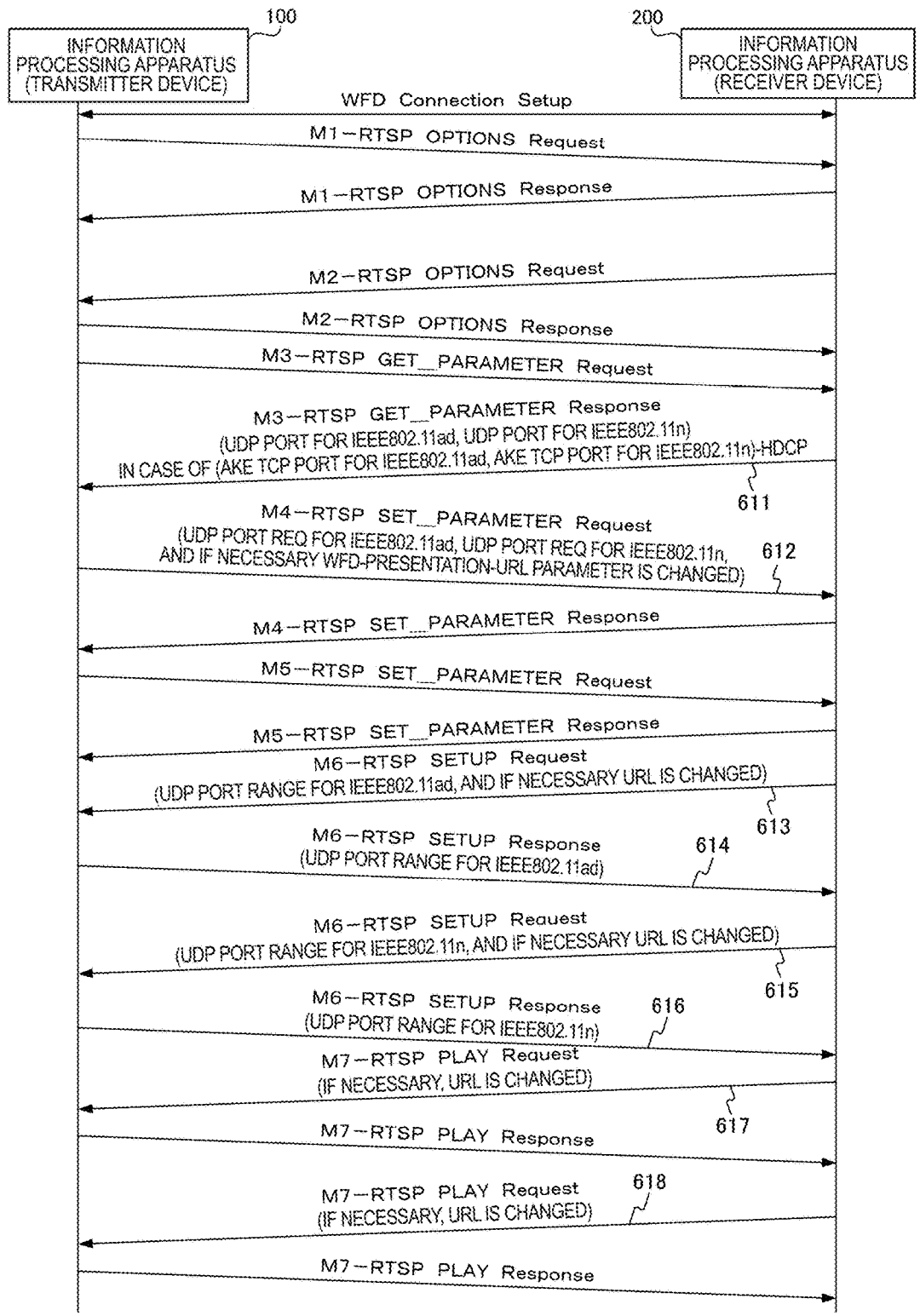

SPLIT MIRACAST TRANSMISSION OVER MULTIPLE FREQUENCY BANDS

TECHNICAL FIELD

The present technology relates to an information processing apparatus. Its detail relates to an information processing apparatus and a communication method for exchanging various types of information by utilizing wireless communication, and a program for causing a computer to execute the method.

BACKGROUND ART

In the past, there has been a wireless communication technology that exchanges various types of data by utilizing wireless communication. For example, an information exchange device is proposed which exchanges various types of data between two wireless communication devices by utilizing wireless communication (for example, refer to Patent Literature 1).

CITATION LIST

Patent Literature

Patent Literature 1: JP 2008-278388A

SUMMARY OF INVENTION

Technical Problem

According to the above past technology, various types of data is exchanged between two information processing apparatuses by utilizing wireless communication, without wired line connection. For example, an image based on image data transmitted from an information processing apparatus of transmission side can be displayed on a display unit of an information processing apparatus of reception side. Also, for example, sound based on sound data transmitted from the information processing apparatus of transmission side can be output from a sound output unit of the information processing apparatus of reception side.

It is important to give a user a good experience, when the image and the sound based on the data transmitted from the information processing apparatus of transmission side are output from the information processing apparatus of reception side, as described above. That is, it is important to execute a data transmission control appropriately, to reduce feeling of strangeness given to a user, and to improve the user experience.

The present technology has been created in consideration of this situation, and its purpose is to execute an appropriate data transmission control.

Solution to Problem

The present technology is created to solve the above-described problem, and a first aspect of the present technology is an information processing apparatus that performs data transmission by using at least one of a wireless transmission channel of a high frequency band and a wireless transmission channel of a low frequency band, and performs real time image transmission with another information processing apparatus in accordance with a wireless fidelity (Wi-Fi) certified miracast specification (technical specification name: Wi-Fi Display), a communication method thereof, and a program for causing a computer to execute the communication method, the information processing apparatus including: a control unit configured to perform a control to transmit a control signal relevant to Wi-Fi certified miracast to the other information processing apparatus, by using the wireless transmission channel of the low frequency band. This provides an effect that a control signal relevant to Wi-Fi certified miracast is transmitted to another information processing apparatus by using the wireless transmission channel of the low frequency band.

According to the first aspect, the control unit may transmit data of a low degree of importance to the other information processing apparatus by using the wireless transmission channel of the high frequency band, and may transmit data of a high degree of importance to the other information processing apparatus by using the wireless transmission channel of the low frequency band. This provides an effect that data of a low degree of importance is transmitted to another information processing apparatus by using the wireless transmission channel of the high frequency band, and data of a high degree of importance is transmitted to the other information processing apparatus by using the wireless transmission channel of the low frequency band.

According to the first aspect, the control unit may transmit image data as the data of the low degree of importance, and may transmit sound data as the data of the high degree of importance. This provides an effect that image data is transmitted as the data of the low degree of importance, and sound data is transmitted as the data of the high degree of importance.

According to the first aspect, when a communication quality of the wireless transmission channel of the high frequency band becomes lower than a threshold, the control unit may switch the wireless transmission channel of the image data from the wireless transmission channel of the high frequency band to the wireless transmission channel of the low frequency band. This provides an effect that, when the communication quality of the wireless transmission channel of the high frequency band becomes lower than a threshold, the wireless transmission channel of the image data is switched from the wireless transmission channel of the high frequency band to the wireless transmission channel of the low frequency band.

According to the first aspect, when switching the wireless transmission channel, the control unit may perform at least one of changing an encoding method of the image data, switching between use and non-use of a highly efficient encoding, and changing a type and a setting item of the highly efficient encoding. This provides an effect that, when the wireless transmission channel is switched, at least one of changing of the encoding method of image data, switching between use and non-use of highly efficient encoding, and changing of type and setting item of highly efficient encoding is performed.

According to the first aspect, the control unit may encode image data transmitted after switching the wireless transmission channel, in a decodable manner that does not depend on image data transmitted before switching the wireless transmission channel, and may transmit the encoded image data to the other information processing apparatus. This provides an effect that the image data transmitted after switching the wireless transmission channel is encoded in a decodable manner that does not depend on the image data transmitted before switching the wireless transmission channel, and is transmitted to another information processing apparatus.

According to the first aspect, the control unit may simultaneously transmit image data for outputting a same image to the other information processing apparatus, by using both of the wireless transmission channel of the high frequency band and the wireless transmission channel of the low frequency band. This provides an effect that image data for outputting the same image is simultaneously transmitted to another information processing apparatus by using both of the wireless transmission channel of the high frequency band and the wireless transmission channel of the low frequency band.

According to the first aspect, the control unit may selects a wireless transmission channel for use in transmission of the data from among a plurality of wireless transmission channels, on the basis of characteristics of the plurality of wireless transmission channels and information relevant to transmission target data. This provides an effect that the wireless transmission channel used in data transmission is selected from among a plurality of wireless transmission channels, on the basis of characteristics of a plurality of wireless transmission channels and information relevant to transmission target data.

According to the first aspect, when transmitting multiple data to the other information processing apparatus by using both of the wireless transmission channel of the high frequency band and the wireless transmission channel of the low frequency band, the control unit may generate a plurality of transmission control protocol (TCP) sessions on the wireless transmission channel of the low frequency band, and may generate a plurality of real time streaming protocol (RTSP) sessions for transmitting the multiple data on each of the TCP sessions. This provides an effect that, when multiple data is transmitted to another information processing apparatus by using both of the wireless transmission channel of the high frequency band and the wireless transmission channel of the low frequency band, a plurality of TCP sessions are generated on the wireless transmission channel of the low frequency band, and a plurality of RTSP sessions for transmitting multiple data are generated on each of the TCP sessions.

According to the first aspect, when transmitting multiple data to the other information processing apparatus by using both of the wireless transmission channel of the high frequency band and the wireless transmission channel of the low frequency band, the control unit may generate one TCP session on the wireless transmission channel of the low frequency band, and may generate one RTSP session for transmitting the multiple data on the TCP session. This provides an effect that, when multiple data is transmitted to another information processing apparatus by using both of the wireless transmission channel of the high frequency band and the wireless transmission channel of the low frequency band, one TCP session is generated on the wireless transmission channel of the low frequency band, and one RTSP session for transmitting multiple data is generated on the TCP session.

According to the first aspect, when generating the one RTSP session, the control unit may additionally write a port number relevant to the wireless transmission channel for use in transmission of the multiple data, by separating an RTSP message with one of a comma, a colon, a semicolon, a period, a + symbol, a slash, and a space. This provides an effect that, when one RTSP session is generated, the port number relevant to the wireless transmission channel used when multiple data is transmitted is additionally written by separating the RTSP message with one of comma, colon, semicolon, period, + symbol, slash, and space.

According to the first aspect, when the other information processing apparatus complies with a real-time transport control protocol (RTCP), the control unit may write two consecutive values separated with a hyphen as user datagram protocol (UDP) port numbers with respect to client_por in an M6 request message and an M6 response message and server_port in an M6 response message, and may associate a first value with a real-time transport protocol (RTP), and may associate a second value with the RTCP. This provides an effect that, when another information processing apparatus complies with the RTCP, two consecutive values separated with a hyphen are written as UDP port numbers with respect to client_por in the M6 request message and the M6 response message and server_port in the M6 response message, and the first value is associated with the RTP, and the second value is associated with the RTCP.

According to the first aspect, when transmitting multiple data to the other information processing apparatus by using both of the wireless transmission channel of the high frequency band and the wireless transmission channel of the low frequency band, the control unit may generate one TCP session on the wireless transmission channel of the low frequency band, and may generate a plurality of RTSP sessions for transmitting the multiple data on the TCP session. This provides an effect that, when multiple data is transmitted to another information processing apparatus by using both of the wireless transmission channel of the high frequency band and the wireless transmission channel of the low frequency band, one TCP session is generated on the wireless transmission channel of the low frequency band, and a plurality of RTSP sessions for transmitting multiple data are generated on the TCP session.

According to the first aspect, when generating the plurality of RTSP sessions, the control unit may include a URL included in an M4 request message, according to the number of the RTSP sessions. This provides an effect that, when a plurality of RTSP sessions are generated, the URL in the M4 request message is included according to the number of RTSP sessions.

According to the first aspect, when generating the plurality of RTSP sessions, the control unit may exchange an M6 message and an M7 message, according to the number of the RTSP sessions. This provides an effect that, when a plurality of RTSP sessions are generated, the M6 message and the M7 message are exchanged according to the number of RTSP sessions.

According to the first aspect, different IP addresses may be used for the wireless transmission channel of the high frequency band and the wireless transmission channel of the low frequency band. This provides an effect that different IP addresses are used for each of the wireless transmission channel of the high frequency band and the wireless transmission channel of the low frequency band.

A second aspect of the present technology is an information processing apparatus that performs data transmission by using at least one of a wireless transmission channel of a high frequency band and a wireless transmission channel of a low frequency band, and performs real time image transmission with another information processing apparatus in accordance with a Wi-Fi certified miracast specification, a communication method thereof, and a program for causing a computer to execute the communication method, the information processing apparatus including: a control unit configured to perform a control to receive a control signal relevant to Wi-Fi certified miracast from the other information processing apparatus by using the wireless transmission channel of the low frequency band. This provides an effect that the control signal relevant to Wi-Fi certified miracast is received from another information processing apparatus by using the wireless transmission channel of the low frequency band.

Also, in this second aspect, when multiple image data for outputting the same image is simultaneously received from the above other information processing apparatus by using both of the above wireless transmission channel of the high frequency band and the above wireless transmission channel of the low frequency band, the above control unit may select high quality image data as the output target image data from among the received multiple image data. This provides an effect that, when multiple image data for outputting the same image is simultaneously received from another information processing apparatus by using both of the wireless transmission channel of the high frequency band and the wireless transmission channel of the low frequency band, high quality image data is selected as the output target image data from among the received multiple image data.

Advantageous Effects of Invention

The present technology provides an excellent effect of executing an appropriate data transmission control. Note that the effect described herein is not necessarily restrictive, but may be one of the effects described in the present disclosure.

BRIEF DESCRIPTION OF DRAWINGS

FIG. 9 is a diagram illustrating an element example considered when selecting a wireless transmission channel by a communication system 10 in the first embodiment of the present technology.

FIG. 10 is a diagram illustrating an example of a characteristic regarded as important at the time of data communication by a communication system 10 in the first embodiment of the present technology.

FIG. 13 is a diagram illustrating an exemplary change of messages exchanged by devices that configure a communication system 10 in the second embodiment of the present technology.

FIG. 14 is a diagram illustrating an exemplary change of messages exchanged by devices that configure a communication system 10 in the second embodiment of the present technology.

FIG. 17 is a diagram illustrating an exemplary change of messages exchanged by devices that configure a communication system 10 in the second embodiment of the present technology.

FIG. 18 is a sequence chart illustrating an exemplary communication process between devices that configure a communication system 10 in the second embodiment of the present technology.

DESCRIPTION OF EMBODIMENTS

In the following, a mode for carrying out the present technology (hereinafter, referred to as an embodiment) will be described. Description will be made in the following order.

1. First Embodiment (an example in which each data (image data and sound data) is transmitted by using a plurality of types of wireless transmission channels)

2. Second Embodiment (an extended example of a control message of Wi-Fi certified miracast)

3. Application Example

1. First Embodiment

Exemplary Configuration of Communication System

Figure 1:
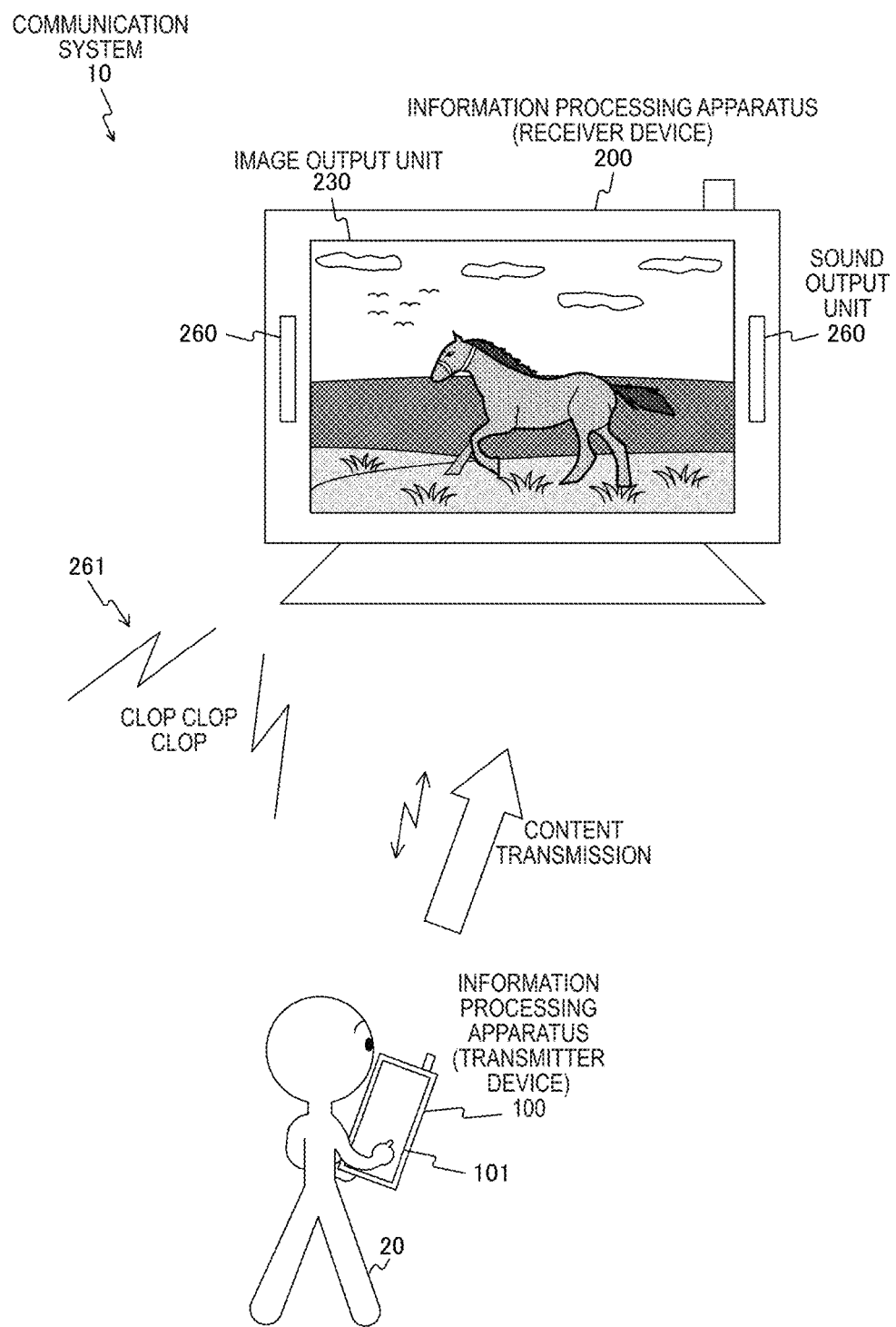
FIG. 1 is a diagram illustrating an exemplary configuration of a communication system 10 in a first embodiment of the present technology.

FIG. 1 is a diagram illustrating an exemplary configuration of a communication system 10 in the first embodiment of the present technology. FIG. 1 illustrates an example of a system configuration including two information processing apparatuses (information processing apparatuses 100 and 200) that are connected directly and wirelessly.

The communication system 10 includes the information processing apparatuses 100 and 200. For example, the information processing apparatus 100 is a transmitter device that has a wireless communication function (for example, an electronic device that transmits image (video) and sound via a network). Also, for example, the information processing apparatus 200 is a receiver device that has a wireless communication function (for example, an electronic device that outputs image and sound received from a network).

Figure 2:
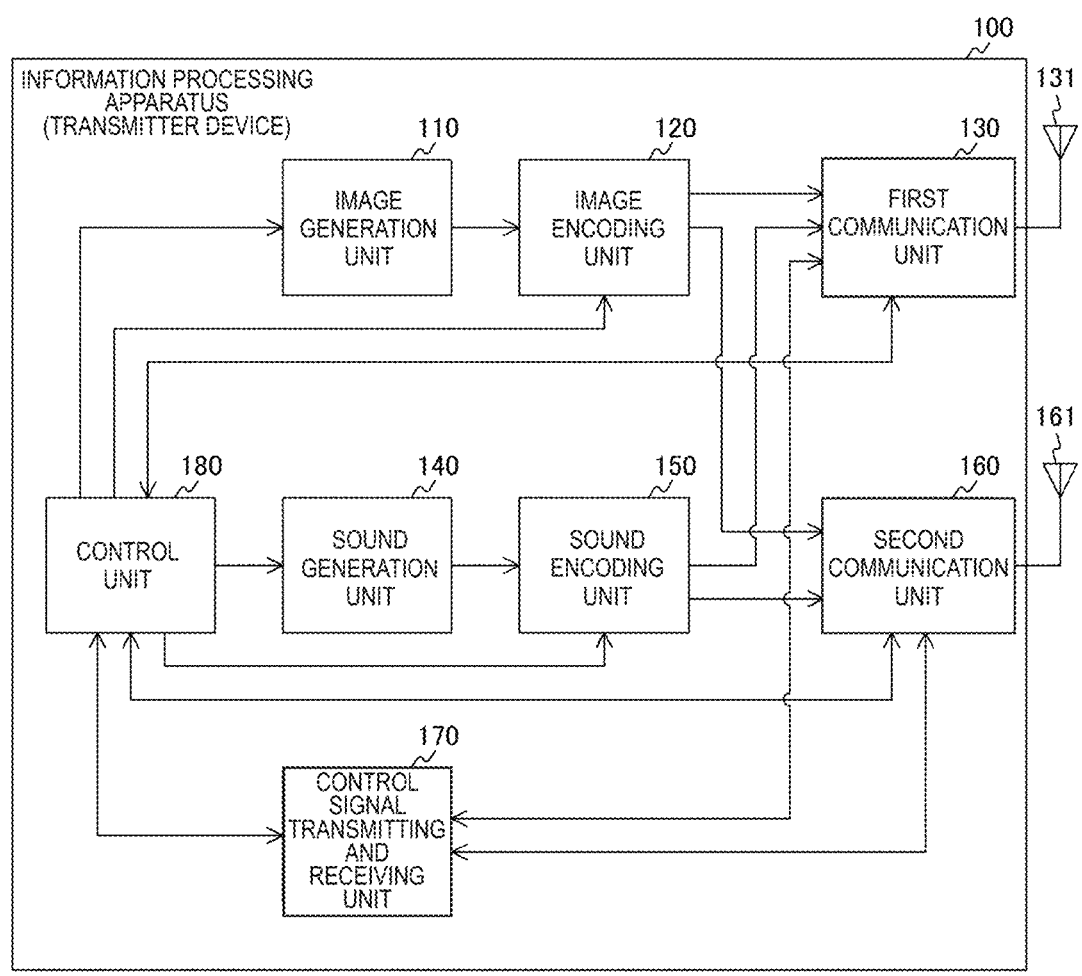
FIG. 2 is a block diagram illustrating an exemplary function and configuration of an information processing apparatus 100 in the first embodiment of the present technology.
Figure 3:
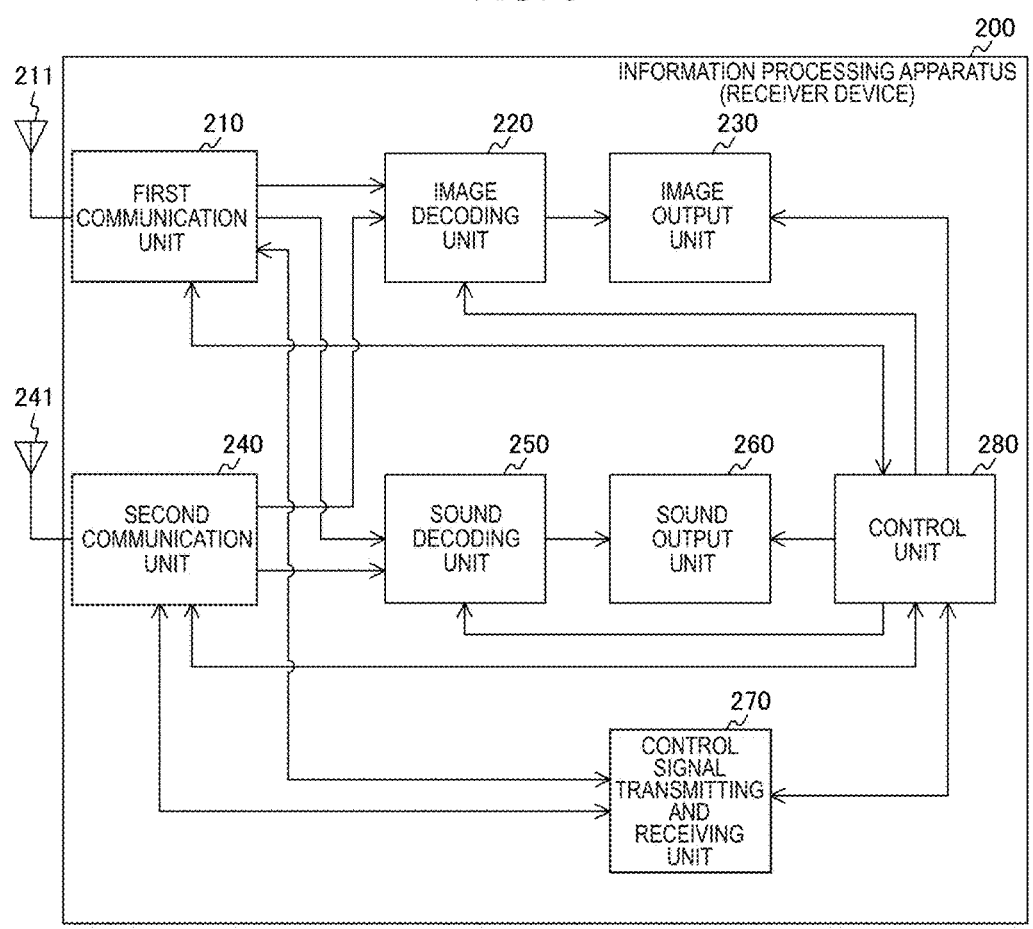
FIG. 3 is a block diagram illustrating an exemplary function and configuration of an information processing apparatus 200 in the first embodiment of the present technology.

Note that an exemplary configuration of the information processing apparatus 100 is illustrated in FIG. 2, and an exemplary configuration of the information processing apparatus 200 is illustrated in FIG. 3.

Note that FIG. 1 illustrates an example in which the information processing apparatus 100 is a portable information processing apparatus that has a wireless communication function (for example, a smartphone, a tablet terminal). Also, an example in which the information processing apparatus 200 is a display device that has a wireless communication function (for example, a television, a projector, and a personal computer) is illustrated. Although FIG. 1 illustrates an example in which the information processing apparatus 100 is a portable information processing apparatus, another information processing apparatus may be used. For example, an image capturing device that has a wireless communication function (for example, a digital still camera, a digital video camera (for example, a camera integrated recorder)) and an electronic device equipped with a camera (for example, a personal computer, a game machine) may be used as the information processing apparatus 100. Also, although FIG. 1 illustrates an example in which the information processing apparatus 200 is a display device that has a wireless communication function, another information processing apparatus may be used. For example, another electronic device including a display unit (for example, an image capturing device, a game machine, a smartphone, a tablet terminal) and a portable information processing apparatus (for example, a smartphone, a tablet terminal) may be used as the information processing apparatus 200.

Also, the information processing apparatuses 100 and 200 may be wireless communication devices compliant with the institute of electrical and electronics engineers (IEEE) 802.11 specification, for example. Then, the information processing apparatuses 100 and 200 can exchange various types of information by utilizing the wireless communication function.

Also, for example, a wireless local area network (LAN) may be used as the wireless communication used in the communication system 10. For example, wireless fidelity (Wi-Fi) direct, tunneled direct link setup (TDLS), or ad hoc network may be used as the wireless LAN. Also, for example, Wi-Fi certified miracast may be used as short distance wireless audio visual (AV) transmission communication used in the communication system 10. Note that Wi-Fi certified miracast is a mirroring technology that utilizes the technology of Wi-Fi Direct and TDLS, so that sound and displayed video reproduced at one of terminals are transmitted to another terminal, and the sound and the image data are output at the other terminal in the same way.

Also, in Wi-Fi certified miracast, a user input back channel (UIBC) is configured on a transmission control protocol/internet protocol (TCP/IP). The UIBC is a technology for transmitting operation information of an input device such as a mouse and a keyboard from one of terminals to another terminal. Note that other remote desktop software (for example, virtual network computing (VNC)) may be employed, instead of Wi-Fi certified miracast.

Here, for example, Wi-Fi certified miracast stipulates that an image (video) is compressed and decompressed by using H.264. Also, for example, in Wi-Fi certified miracast, H.264 can be adjusted at the transmission side.

For example, as illustrated in FIG. 1, a user 20 operates a touch panel 101 of the information processing apparatus 100, in order to transmit content (for example, image data and sound data) stored in the information processing apparatus 100 to the information processing apparatus 200. Then, the information processing apparatus 200 displays the image based on the content transmitted from the information processing apparatus 100 on an image output unit 230, and outputs the sound based on the content from a sound output unit 260. FIG. 1 illustrates an example in which a running horse is displayed on the image output unit 230 as the image based on the content transmitted from the information processing apparatus 100, and sound 261 of the running horse is output from the sound output unit 260 as the sound based on the content.

Here, a case is assumed in which encoded image data, encoded sound data, and control commands are transmitted from a certain device to another device via the wireless transmission channel, as in Wi-Fi certified miracast. In this case, each of those data can be transmitted by using one type of wireless transmission channel (for example, a wireless LAN of 2.4 GHz band (for example, Wi-Fi Direct)), for example. However, when each data is transmitted as described above, and the communication quality of the wireless transmission channel deteriorates, it becomes highly possible that the data is lost, and it is concerned that all data of the image data, the sound data and the control commands are affected.

In general, when the image data and the sound data are transmitted, the control command and the sound stream have a relatively high degree of importance, and the image stream has a relatively low degree of importance. For example, in the video meeting system, uninterrupted sound is regarded as more important than image, in many cases. Thus, when the transmitter device and the receiver device are compatible with a plurality of types of wireless transmission channels, it is conceived that each data is simultaneously transmitted by using the wireless transmission channels of the types, depending on the degree of importance. For example, it is conceived that data of a relatively high degree of importance is transmitted by using a wireless transmission channel of a high communication quality type, and data of a relatively low degree of importance is transmitted by using a wireless transmission channel of a low communication quality type.

For example, a mobile telephone network (3G and LTE) does not have a wide band generally, but the communication quality is high in many cases, because the base station controls communication. Thus, it is conceived that the sound data is transmitted to the other device via the mobile telephone network, and the image data is transmitted by using the wireless LAN or the like of relatively low reliability. A high user experience is provided at the receiver device side, by transmitting as described above.

Also, in future, it is possible that a wireless transmission method using a millimeter wave (for example, IEEE802.11ad using 60 GHz) is newly introduced in the transmission using Wi-Fi certified miracast (for example, transmission of image data and sound data). The wireless transmission channel using the millimeter wave has an advantage of very wide band as well as a high straight traveling property, and has a drawback that a data loss occurs if an obstacle is interposed therebetween.

Thus, it is conceived that the sound data and the control command that do not need a band but has a relatively high degree of importance are transmitted by using Wi-Fi Direct of 2.4 GHz band/5 GHz band in which the possibility of data loss is relatively low, for example. Also, it is conceived that the image data that needs a wide band but has a relatively low degree of importance is transmitted by using 60 GHz band of millimeter wave, for example.

Also, when a plurality types of wireless transmission channels are usable as described the above, it is conceived that those are switched or combined to be used, depending on communication situation. Thus, in the first embodiment of the present technology, an example is illustrated in which data transmission is performed by using a plurality of types of wireless transmission channels.

Also, in the first embodiment of the present technology, a transmitter device and a receiver device of Wi-Fi certified miracast compatible with the standard of both of IEEE802.11ad (millimeter wave) and IEEE802.11n (2.4 GHz/5 GHz) will be described as an example. Also, in the first embodiment of the present technology, an example is illustrated in which the transmitter device is the information processing apparatus 100, and the receiver device is the information processing apparatus 200.

In this case, IEEE802.11ad has a wide band, and is used in high bit rate transmission of image data in principle. However, as described above, the millimeter wave has a high straight traveling property, and thus it is concerned that the communication is interrupted, when the position of a device changes, and when a person is interposed between devices. Hence, if the transmission by Wi-Fi certified miracast is employed as it is in IEEE802.11ad, it is envisaged that the image and the sound are interrupted. Also, it is envisaged that the control signal is not transmitted, and the session times out (disconnected).

Thus, IEEE802.11ad is combined with the wireless transmission channel of another type, and a sound part and a control signal part of a relatively high degree of importance are transmitted and received via the wireless transmission channel. For example, IEEE802.11n, which is widely used at the present moment, may be used. Thereby, for example, when a person is interposed between devices, the image is disturbed, but the sound and the control signal are not interrupted so as to continue the communication.

Note that the information processing apparatuses 100 and 200 are one example of information processing apparatuses that perform data transmission by using at least one of the wireless transmission channel of the high frequency band (for example, IEEE802.11ad) and the wireless transmission channel of the low frequency band (for example, IEEE802.11n). Also, the information processing apparatuses 100 and 200 are one example of information processing apparatuses that perform real time image transmission with the other information processing apparatus in accordance with the Wi-Fi certified miracast specification (technical specification name: Wi-Fi Display).

[Exemplary Configuration of Information Processing Apparatus (Transmitter Device)]

FIG. 2 is a block diagram illustrating an exemplary function and configuration of the information processing apparatus 100 in the first embodiment of the present technology.

The information processing apparatus 100 includes an image generation unit 110, an image encoding unit 120, a first communication unit 130, an antenna 131, 161, a sound generation unit 140, a sound encoding unit 150, a second communication unit 160, a control signal transmitting and receiving unit 170, and a control unit 180.

The image generation unit 110 generates image data that is transmitted to the receiver device (for example, the information processing apparatus 200), on the basis of the control by the control unit 180, and outputs the generated image data to the image encoding unit 120. For example, the image generation unit 110 reads, and acquires to use, the image data stored in an external storage device (not illustrated in the drawings). Note that the image data stored in this external storage device may be stream data, or may be file data (for example, file data that has been encoded already). Also, when the image data stored in the external storage device is file data that has been encoded already, the image generation unit 110 acquires the encoded data from the external storage device, and outputs this acquired data as it is. Also, for example, the image generation unit 110 receives, and acquires to use, the image displayed on an image output device (for example, a monitor) equipped in or connected to the information processing apparatus 100, as moving image.

The image encoding unit 120 encodes the image data output from the image generation unit 110 on the basis of the control by the control unit 180 in accordance with a predetermined method, and outputs the encoded image data to the first communication unit 130 or the second communication unit 160. A highly efficient encoding method using data compression may be used as this encoding method, for example. For example, a method using H.264 is employed in the specification of Wi-Fi certified miracast. Note that, when the image data output from the image generation unit 110 has been encoded already, the image encoding unit 120 can output the image data as it is, without executing an additional process for the image data.

The first communication unit 130 transmits each data to the receiver device (for example, the information processing apparatus 200) via the antenna 131, by using the communication standard of IEEE802.11ad, on the basis of the control by the control unit 180. For example, the first communication unit 130 transmits the image data output from the image encoding unit 120 or the sound data output from the sound encoding unit 150 to the receiver device.

The sound generation unit 140 generates the sound data that is transmitted to the receiver device (for example, the information processing apparatus 200) on the basis of the control by the control unit 180, and outputs the generated sound data to the sound encoding unit 150. For example, the sound generation unit 140 reads, and acquires to use, the sound data stored in the external storage device (not illustrated in the drawings). Note that the sound data stored in this external storage device may be stream data, and may be file data (for example, file data that has been encoded already). Also, when the sound data stored in the external storage device is file data that has been encoded already, the sound generation unit 140 can acquire the encoded data from the external storage device, and output this acquired data as it is. Also, for example, the sound generation unit 140 receives, and acquires to use, the sound output from a sound output device (for example, a speaker) equipped in or connected to the information processing apparatus 100, as a waveform.

The sound encoding unit 150 encodes the sound data output from the sound generation unit 140 in accordance with a predetermined method on the basis of the control by the control unit 180, and outputs the encoded sound data to the first communication unit 130 or the second communication unit 160. A highly efficient encoding method using data compression may be used as this encoding method, for example. For example, an encoding method using linear pulse code modulation (LPCM), advanced audio coding (AAC), and audio code number 3 (AC-3) is set in the specification of Wi-Fi certified miracast. Note that, when the sound data output from the sound generation unit 140 has been encoded already, the sound encoding unit 150 outputs the sound data as it is, without executing an additional process for the sound data.

The second communication unit 160 transmits each data to the receiver device (for example, the information processing apparatus 200) via the antenna 161, by using the communication standard of IEEE802.11n, on the basis of the control by the control unit 180. For example, the second communication unit 160 transmits the sound data output from the sound encoding unit 150 and the control signal output from the control signal transmitting and receiving unit 170 (for example, a control message) to the receiver device. Also, the second communication unit 160 outputs the control signal to the control signal transmitting and receiving unit 170, when receiving the control signal transmitted from the receiver device.

The control signal transmitting and receiving unit 170 exchanges control signals (for example, various types of messages) with the control signal transmitting and receiving unit of the receiver device side (for example, the control signal transmitting and receiving unit 270 illustrated in FIG. 3) in accordance with a predetermined method, on the basis of the control by the control unit 180. For example, messages are transmitted and received in accordance with a format which is referred to as real time streaming protocol (RTSP) defined as RFC2326 in the specification of Wi-Fi certified miracast. Then, events, such as start, stop, temporary stop of image transmission and sound transmission, detection of time out, are detected. Also, the transmitter device can be controlled from the receiver device, by transmitting and receiving a message which is referred to as user input back channel (UIBC). Also, the control signal transmitting and receiving unit 170 outputs the detected events and control commands to the control unit 180.

The control unit 180 controls the entire information processing apparatus 100 on the basis of a control program stored in a memory (not illustrated in the drawings). For example, the control unit 180 executes the control to perform initialization, start and stop of the operation of the image generation unit 110, the image encoding unit 120, the first communication unit 130, the sound generation unit 140, the sound encoding unit 150, the second communication unit 160, and the control signal transmitting and receiving unit 170. Also, for example, the control unit 180 executes the control for performing establishment, discard, or the like of the wireless transmission channel to the receiver device (for example, the information processing apparatus 200) via the first communication unit 130 or the second communication unit 160.

[Exemplary Configuration of Information Processing Apparatus (Receiver Device)]

FIG. 3 is a block diagram illustrating an exemplary function and configuration of the information processing apparatus 200 in the first embodiment of the present technology.

The information processing apparatus 200 includes a first communication unit 210, an antenna 211, 241, an image decoding unit 220, an image output unit 230, a second communication unit 240, a sound decoding unit 250, a sound output unit 260, a control signal transmitting and receiving unit 270, and a control unit 280.

The first communication unit 210 receives each data transmitted from an IEEE802.11ad communication unit (for example, the first communication unit 130 of the information processing apparatus 100) of the transmitter device, via the antenna 211, on the basis of the control by the control unit 280. Then, the first communication unit 210 outputs the received data to the image decoding unit 220, the sound decoding unit 250, or the control signal transmitting and receiving unit 270. For example, the first communication unit 210 outputs the image data to the image decoding unit 220, upon receiving the image data transmitted from the IEEE802.11ad communication unit of the transmitter device.

The image decoding unit 220 decodes the image data received from the transmitter device in accordance with a predetermined method on the basis of the control by the control unit 280, and outputs the decoded image data (for example, an actual image signal (video signal)) to the image output unit 230. For example, the image decoding unit 220 decodes the image data output from the first communication unit 130 in accordance with a predetermined method. Also, when data compression is used for the image data of decode target, the image decoding unit 220 decompresses the image data in accordance with a predetermined method. Here, it is also envisaged that the image output unit 230 writes the image data received from the transmitter device, into the external storage device (not illustrated in the drawings) as file data. In this case, the image output unit 230 needs to output the encoded image data as it is, to the external storage device. Hence, when the image output unit 230 needs to output the encoded image data as it is, the image decoding unit 220 does not decode but outputs the encoded image data as it is, to the image output unit 230.

The image output unit 230 displays the image data (the image signal) output from the image decoding unit 220, on the basis of the control by the control unit 280. For example, the image output unit 230 corresponds to a liquid crystal monitor and a display panel (for example, an organic electro luminescence (EL), a liquid crystal display (LCD)). Note that the image output unit 230 may be equipped in the information processing apparatus 200, or may be attached to the outside of the information processing apparatus 200 as another device.

The second communication unit 240 receives each data transmitted from an IEEE802.11n communication unit (for example, the second communication unit 160 of the information processing apparatus 100) of the transmitter device via an antenna 241 on the basis of the control by the control unit 280. Then, the second communication unit 240 outputs the received data to the image decoding unit 220, the sound decoding unit 250, or the control signal transmitting and receiving unit 270. For example, the second communication unit 240 outputs the sound data to the sound decoding unit 250, upon receiving the sound data transmitted from the IEEE802.11n communication unit of the transmitter device. Also, for example, the second communication unit 240 outputs the control signal to the control signal transmitting and receiving unit 270, upon receiving the control signal (for example, the control message) transmitted from the IEEE802.11n communication unit of the transmitter device. Also, the second communication unit 240 transmits the control signal generated by the control signal transmitting and receiving unit 270, to the IEEE802.11n communication unit (for example, the second communication unit 160 of the information processing apparatus 100) of the transmitter device.

The sound decoding unit 250 decodes the sound data received from the transmitter device in accordance with a predetermined method on the basis of the control by the control unit 280, and outputs the decoded sound data (for example, an actual audio signal) to the sound output unit 260. For example, the sound decoding unit 250 decodes the sound data output from the second communication unit 240 in accordance with a predetermined method. Also, when data compression is used for the sound data of decode target, the sound decoding unit 250 decompresses the sound data in accordance with a predetermined method. Here, it is also envisaged that the sound output unit 260 writes the sound data received from the transmitter device into the external storage device (not illustrated in the drawings) as file data. In this case, the sound output unit 260 needs to output the encoded sound data as it is, to the external storage device. Hence, when the sound output unit 260 needs to output the encoded sound data as it is, the sound decoding unit 250 does not decode but outputs the encoded sound data as it is to the sound output unit 260.

The sound output unit 260 outputs the sound data (the audio signal) output from the sound decoding unit 250 as sound on the basis of the control by the control unit 280. For example, the sound output unit 260 corresponds to a speaker. Note that the sound output unit 260 may be equipped in the information processing apparatus 200, and may be attached to the outside of the information processing apparatus 200 as another device.

The control signal transmitting and receiving unit 270 exchanges the control signals (for example, messages) with the control signal transmitting and receiving unit of the transmitter device side (for example, the control signal transmitting and receiving unit 170 illustrated in FIG. 2), in accordance with a predetermined method, on the basis of the control by the control unit 280. For example, the exchange of the control signal is performed in the same way as the control signal transmitting and receiving unit 170 illustrated in FIG. 2. Also, the control signal transmitting and receiving unit 270 outputs the detected events and control commands to the control unit 280.

The control unit 280 controls the entire information processing apparatus 200 on the basis of a control program stored in a memory (not illustrated in the drawings). For example, the control unit 280 executes the control to perform initialization, start and stop of the operation of the first communication unit 210, the image decoding unit 220, the image output unit 230, the second communication unit 240, the sound decoding unit 250, the sound output unit 260, and the control signal transmitting and receiving unit 270. Also, for example, the control unit 280 executes the control for performing establishment, discard, or the like of the wireless transmission channel to the transmitter device (for example, the information processing apparatus 100) via the first communication unit 210 or the second communication unit 240.

[Data Communication Example Using Two Types of Wireless Transmission Channels]

Next, an exemplary operation when performing data communication by using two types of wireless transmission channels will be described.

[Exemplary Operation of Information Processing Apparatus (Transmitter Device)]

Figure 4:
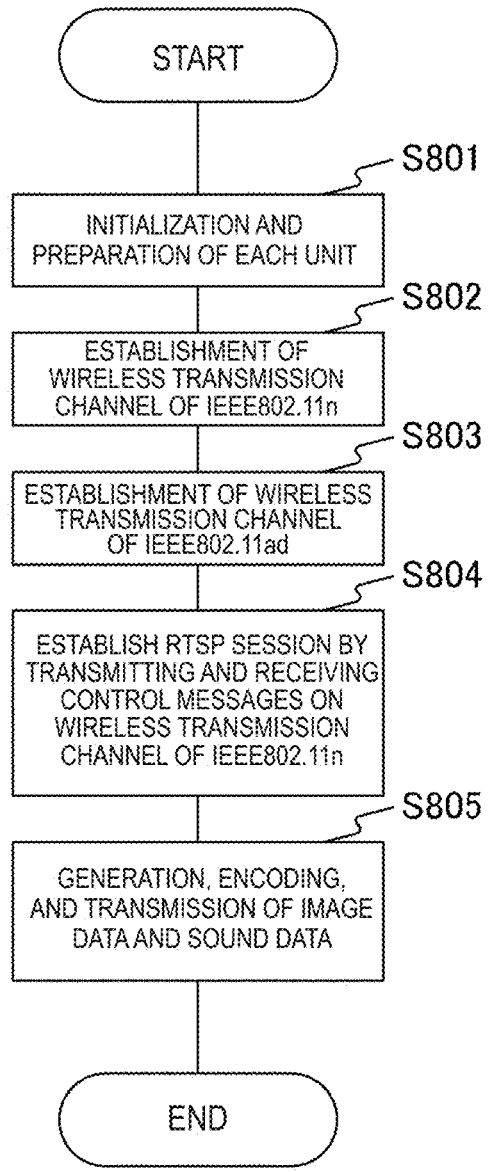
FIG. 4 is a flowchart illustrating an example of a process procedure of a data transmission control process by an information processing apparatus 100 (a transmitter device) in the first embodiment of the present technology.

FIG. 4 is a flowchart illustrating an example of the process procedure of the data transmission control process by the information processing apparatus 100 (the transmitter device) in the first embodiment of the present technology. FIG. 4 illustrates an example in which wireless communication is performed between the information processing apparatus 100 (the transmitter device) and the information processing apparatus 200 (the receiver device). Also, FIG. 4 illustrates an example which causes the first communication unit 130 to transmit the image data and causes the second communication unit 160 to transmit the sound data and the control data (the control signal).

First, the control unit 180 performs initialization and preparation of each unit to transmit the image data and the sound data to the information processing apparatus 200 (the receiver device) (step S801).

Subsequently, the control unit 180 operates the second communication unit 160 to establish the wireless transmission channel (the communication channel) with the second communication unit 240 of the information processing apparatus 200 (the receiver device) (step S802). That is, the control unit 180 establishes the wireless transmission channel of IEEE802.11n (step S802).

Also, the control unit 180 operates the first communication unit 130 to establish the wireless transmission channel (the communication channel) with the first communication unit 210 of the information processing apparatus 200 (the receiver device) (step S803). That is, the control unit 180 establishes the wireless transmission channel of IEEE802.11ad (step S803).

Note that FIG. 4 illustrates an example which establishes the wireless transmission channel of IEEE802.11n (step S802) and thereafter establishes the wireless transmission channel of IEEE802.11ad (step S803). Note that the timing for establishing the wireless transmission channel of IEEE802.11ad is not limited thereto. For example, the timing for establishing the wireless transmission channel of IEEE802.11ad may be another timing before transmitting the image data by using the wireless transmission channel of IEEE802.11ad. For example, the wireless transmission channel of IEEE802.11ad may be established before step S802, and the wireless transmission channel of IEEE802.11ad may be established after step S804.

Subsequently, the control unit 180 operates the control signal transmitting and receiving unit 170 to exchange necessary control messages with the control signal transmitting and receiving unit 270 of the information processing apparatus 200 (the receiver device) via the second communication unit 160 (step S804). That is, the control unit 180 executes the control for establishing an RTSP session by transmitting and receiving the control messages on the wireless transmission channel of IEEE802.11n (step S804).

Then, transmission and reception of the necessary control messages completes, and the RTSP session is established (step S804), and thereafter the control unit 180 operates the image generation unit 110, the image encoding unit 120, the sound generation unit 140, and the sound encoding unit 150. Then, the control unit 180 executes the control for encoding the generated image data and sound data and transmitting each of those data to the information processing apparatus 200 (the receiver device) via the first communication unit 130 and the second communication unit 160 (step S805). Specifically, the control unit 180 transmits the encoded image data to the information processing apparatus 200 (the receiver device) via the first communication unit 130 (step S805). Also, the control unit 180 transmits the encoded sound data to the information processing apparatus 200 (the receiver device) via the second communication unit 160 (step S805). Also, the transmission process (step S805) is performed repeatedly, until an instruction of transmission end of the image data and the sound data is issued.

As described above, the control unit 180 executes the control to transmit the control signal relevant to Wi-Fi certified miracast to the information processing apparatus 200 by using the wireless transmission channel of the low frequency band (for example, IEEE802.11n). In this case, the control unit 180 transmits data of a low degree of importance to the information processing apparatus 200 by using the wireless transmission channel of the high frequency band (for example, IEEE802.11ad), and transmits data of a high degree of importance to the information processing apparatus 200 by using the wireless transmission channel of the low frequency band. For example, the control unit 180 transmits the image data as the data of a low degree of importance, and transmits the sound data as the data of a high degree of importance.

[Exemplary Operation of Information Processing Apparatus (Receiver Device)]

Figure 5:
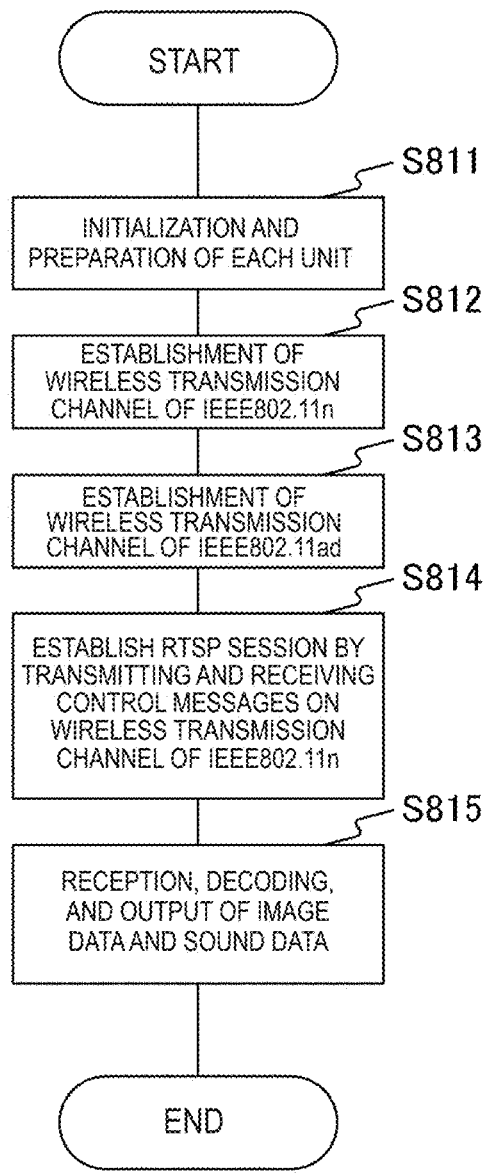
FIG. 5 is a flowchart illustrating an example of a process procedure of a data reception control process by an information processing apparatus 200 (a receiver device) in the first embodiment of the present technology.

FIG. 5 is a flowchart illustrating an example of the process procedure of the data reception control process by the information processing apparatus 200 (the receiver device) in the first embodiment of the present technology. FIG. 5 illustrates an example in which wireless communication is performed between the information processing apparatus 100 (the transmitter device) and the information processing apparatus 200 (the receiver device). Also, FIG. 5 illustrates an example which causes the first communication unit 210 to receive the image data and causes the second communication unit 240 to receive the sound data and the control data (the control signal). Also, the data reception control process illustrated in FIG. 5 corresponds to the data transmission control process illustrated in FIG. 4.

First, the control unit 280 performs initialization and preparation of each unit to receive the image data and the sound data from the information processing apparatus 100 (the transmitter device) (step S811).

Subsequently, the control unit 280 operates the second communication unit 240 to establish the wireless transmission channel (the communication channel) with the second communication unit 160 of the information processing apparatus 100 (the transmitter device) (step S812). That is, the control unit 280 establishes the wireless transmission channel of IEEE802.11n (step S812).

Also, the control unit 280 operates the first communication unit 210 to establish the wireless transmission channel (the communication channel) with the first communication unit 130 of the information processing apparatus 100 (the transmitter device) (step S813). That is, the control unit 280 establishes the wireless transmission channel of IEEE802.11ad (step S813).

Note that FIG. 5 illustrates an example in which the wireless transmission channel of IEEE802.11n is established (step S812), and thereafter the wireless transmission channel of IEEE802.11ad is established (step S813). Note that, in the same way as the example illustrated in FIG. 4, the timing for establishing the wireless transmission channel of IEEE802.11ad is not limited thereto. For example, the timing for establishing the wireless transmission channel of IEEE802.11ad may be another timing before transmitting the image data through the wireless transmission channel of IEEE802.11ad. For example, the wireless transmission channel of IEEE802.11ad may be established before step S812, and the wireless transmission channel of IEEE802.11ad may be established after step S814.

Subsequently, the control unit 280 operates the control signal transmitting and receiving unit 270 to exchange the necessary control messages with the control signal transmitting and receiving unit 170 of the information processing apparatus 100 (the transmitter device) via the second communication unit 240 (step S814). That is, the control unit 280 executes the control for establishing the RTSP session by transmitting and receiving the control messages on the wireless transmission channel of IEEE802.11n (step S814).

Then, transmission and reception of the necessary control messages completes, and the RTSP session is established (step S814), and thereafter the control unit 280 executes the control for outputting each data received from the information processing apparatus 100 (the transmitter device) (step S815). Specifically, the control unit 280 causes the image decoding unit 220 to decode the image data received via the first communication unit 210, and outputs this decoded image data from the image output unit 230 (step S815). Also, the control unit 280 causes the sound decoding unit 250 to decode the sound data received via the second communication unit 240, and outputs this decoded sound data from the sound output unit 260 (step S815). Also, the reception process (step S815) is performed repeatedly, until an instruction of reception end of the image data and the sound data is issued.

As described above, the control unit 280 executes the control to receive the control signal relevant to Wi-Fi certified miracast from the information processing apparatus 100 by using the wireless transmission channel of the low frequency band (for example, IEEE802.11n).

In the above, an example in which the data is divided and transmitted in two types of wireless transmission channels has been illustrated. That is, an example in which the image data is transmitted through the wireless transmission channel of IEEE802.11ad, and the sound data is transmitted through the wireless transmission channel of IEEE802.11n has been illustrated. Note that the transmission method of the data is not limited to these. In the following, an example of another communication method will be illustrated.

[Example in which Wireless Transmission Channel for Transmitting Image Data is Changed According to Communication Quality of Wireless Transmission Channel]

As described above, for example, if an obstacle is interposed between the devices in the wireless transmission channel of IEEE802.11ad, data loss occurs. Thus, when the communication quality of the wireless transmission channel deteriorates as described above, the image data is transmitted by using another wireless transmission channel temporarily. Thereby, a defect of the image data is prevented. An example of the transmission process illustrated in FIG. 6, and an example of the reception process is illustrated in FIG. 7.

[Exemplary Operation of Information Processing Apparatus (Transmitter Device)]

Figure 6:
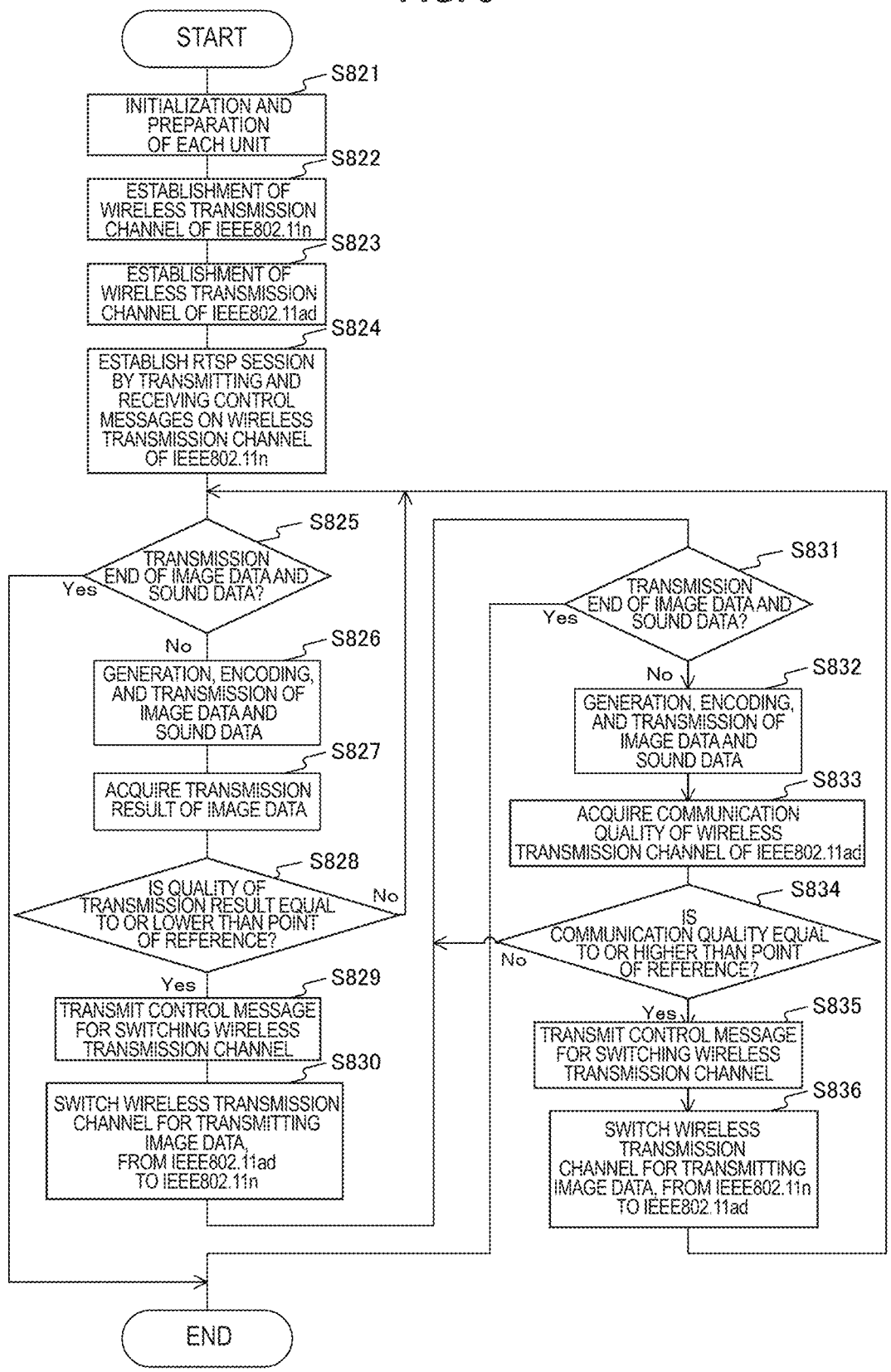
FIG. 6 is a flowchart illustrating an example of a process procedure of a data transmission control process by an information processing apparatus 100 (a transmitter device) in the first embodiment of the present technology.
Figure 7:
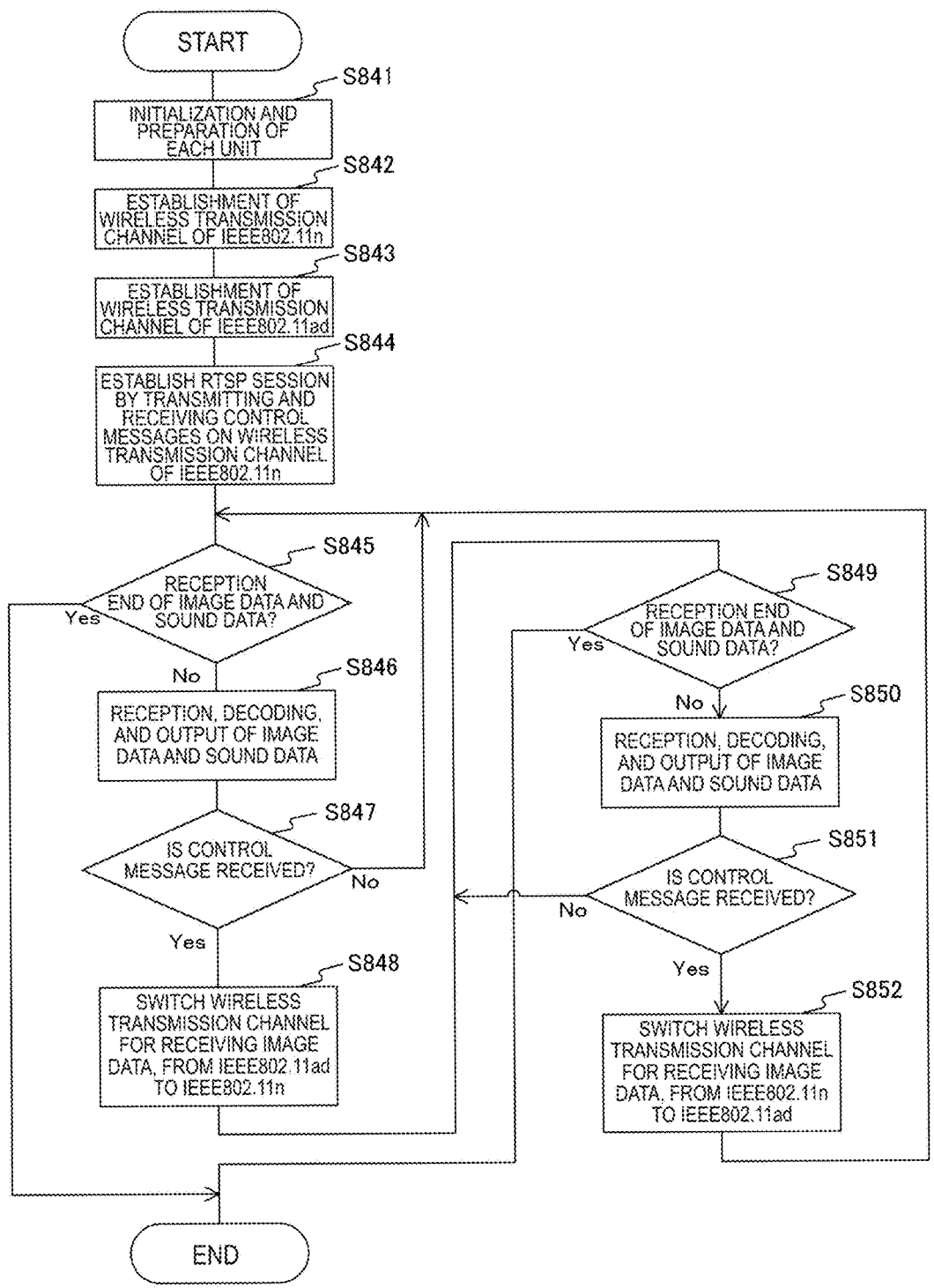
FIG. 7 is a flowchart illustrating an example of a process procedure of a data reception control process by an information processing apparatus 200 (a receiver device) in the first embodiment of the present technology.

FIG. 6 is a flowchart illustrating an example of the process procedure of the data transmission control process by the information processing apparatus 100 (the transmitter device) in the first embodiment of the present technology. FIG. 6 illustrates an example in which wireless communication is performed between the information processing apparatus 100 (the transmitter device) and the information processing apparatus 200 (the receiver device). Also, FIG. 6 illustrates an example of the data transmission control process that switches two types of wireless transmission channels in the transmitter device.

Note that each process (steps S821 to S824) executed until the RTSP session is established is the same as each process (steps S801 to S804) illustrated in FIG. 4, and thus the description will be omitted here.

After the RTSP session is established (step S824), the control unit 180 determines whether or not to end the currently executed transmission process of image data and sound data (step S825). Then, if it is determined to end the transmission process (step S825), the operation of the data transmission control process is ended.

For example, the control unit 180 determines to end the currently executed transmission process of image data and sound data, if a transmission stop of the image data and the sound data is instructed by user operation (step S825). Also, for example, the control unit 180 determines to end the currently executed transmission process of image data and sound data, if a control command that means a stop of the data transmission is transmitted from the control signal transmitting and receiving unit 270 of the information processing apparatus 200 (the receiver device) (step S825). Also, for example, the control unit 180 determines to end the currently executed transmission process of image data and sound data, if the control command is unable to be transmitted and received for a certain amount of time and the session times out (step S825). Note that these determination criteria are an example, and another determination criterion may be used. Also, although FIG. 6 illustrates an example in which the determination process (step S824) is performed immediately after the RTSP session is established (step S824), the determination process may be executed at another timing. For example, it may be performed at a timing at or after step S824.

Note that the data transmission process (step S826) is the same as the data transmission process (step S805) illustrated in FIG. 4, and thus the description will be omitted here.

After transmitting the image data via the first communication unit 130 (step S826), the control unit 180 estimates the communication quality of the wireless transmission channel (IEEE802.11ad) through which the image data is transmitted (step S827). That is, the control unit 180 acquires a transmission result for confirming whether or not the image data has arrived at the information processing apparatus 200 (the receiver device), by estimating the communication quality of the wireless transmission channel (step S827).

[Estimation Method of Communication Quality of Wireless Transmission Channel (IEEE802.11ad)]

Here, an estimation method for estimating the communication quality of the wireless transmission channel (IEEE802.11ad) will be described.

[Example Using Reception Acknowledgement Message from Receiver Device]

First, the estimation method for estimating the communication quality of the wireless transmission channel (IEEE802.11ad) will be described by using a reception acknowledgement message from the receiver device.

For example, in the scheme of IEEE802.11n and IEEE802.11ad, the receiver device sends a predetermined frame back to the transmitter device, when receiving the sent data frame correctly. This predetermined frame is referred to as Ack (ACKnowledgement) or Block Ack. The transmitter device monitors whether or not the reception acknowledgement message is transmitted from the receiver device, in order to determine whether the transmitted data has arrived at the receiver device correctly, or whether the data has a defect.

[Example Using Communication Quality Report from Receiver Device]

Next, the estimation method for estimating the communication quality of the wireless transmission channel (IEEE802.11ad) will be described by using a communication quality report from the receiver device.

For example, it is conceived to transmit the report of the reception quality from the receiver device to the transmitter device on a regular basis, by using real-time transport control protocol (RTCP) defined in RFC3550. The size (the number of bytes), the number of packets, or the like can be included in the report of the reception quality of the received data. The transmitter device estimates a data defect situation, by comparing the size of data and the number of packets transmitted by the transmitter device with these information (the report of the reception quality). Note that information used as statistics information can be included in the report of the reception quality, for example.

[Example Using Retransmission Request from Receiver Device]

Next, the estimation method for estimating the communication quality of the wireless transmission channel (IEEE802.11ad) will be described by using a retransmission request from the receiver device.

For example, it is conceived that, when a defect is found in the received data, the receiver device explicitly requests a data retransmission to the transmitter device. For example, a control message of RTSP can be transmitted from the receiver device to the transmitter device. As described above, when too many retransmission requests arrives at the transmitter device from the receiver device to request data retransmissions, the transmitter device estimates that the communication quality of the wireless transmission channel has deteriorated.

Note that, as a detection method to detect a data defect in the receiver device, a detection method that detects a data defect by checking a sequence number and time point information (time stamp) given to a packet of each data is conceived, for example. In this detection method, when there is shortage of the sequence number and the time point for example, it is determined that the data has a defect.

[Example Using Number of Retransmissions]

Next, the estimation method for estimating the communication quality of the wireless transmission channel (IEEE802.11ad) will be described by using the number of retransmissions.

For example, in IEEE802.11n and IEEE802.11ad, if transmission of a data frame fails, retransmission can be tried several times after the failure. In this case, when the retransmission occurs frequently, it is possible that an influence of noise is given from the same channel or adjacent channels, and that a data frame has not arrived correctly due to too long distance between the transmitter device and the receiver device. Thus, the transmitter device counts the number of retransmissions, and determines that the communication quality of the count target wireless transmission channel has deteriorated when the count value increases at a predetermined rate or more.

[Example Using Size of Data Accumulated in Transmission Buffer in Transmitter Device]

Next, the estimation method for estimating the communication quality of the wireless transmission channel (IEEE802.11ad) will be described, by using the size of the data accumulated in the transmission buffer in the transmitter device.

In general, the transmitter device is provided with a transmission buffer for storing transmitted data temporarily, in many cases. For example, when the data amount transmitted via the wireless transmission channel actually is smaller than the data amount to be transmitted, the data that has not been transmitted yet is accumulated temporarily in the transmission buffer. Thus, whether or not the data transmission through the wireless transmission channel is sufficient is confirmed by checking the size of data that stays in the transmission buffer on a regular basis. When the data transmission is insufficient, it is estimated that the communication quality of the wireless transmission channel is bad.

[Example Using Transmission and Reception Situation of Control Message]

Next, the estimation method for estimating the communication quality of the wireless transmission channel (IEEE802.11ad) will be described by using the transmission and reception situation of the control message.

For example, in Wi-Fi certified miracast, there is a mechanism in which the transmitter device transmits control messages to the receiver device at constant time intervals and confirms whether or not an acknowledge returns within a stipulated time. This mechanism is referred to as keep-alive. When this mechanism is introduced in each wireless transmission channel, and control messages are exchanged on a regular basis, and transmission and reception does not complete in the stipulated time, it is estimated that the communication quality of the wireless transmission channel has deteriorated.

Note that the estimation method of the communication quality of the wireless transmission channel (IEEE802.11ad) illustrated above is an example and is not limited thereto, but another estimation method of communication quality may be used. Also, a combination of two or more of the estimation methods of the communication quality of the wireless transmission channel (IEEE802.11ad) illustrated above may be used.

[Exemplary Operation of Information Processing Apparatus (Transmitter Device)]

The control unit 180 determines whether or not the communication quality of the wireless transmission channel (IEEE802.11ad) is bad, by using the estimation method of the communication quality of the wireless transmission channel illustrated above or another estimation method of communication quality (step S828). That is, the control unit 180 determines whether or not the communication quality of the wireless transmission channel (IEEE802.11ad) is equal to or lower than a threshold (step S828). For example, the control unit 180 determines whether or not the value corresponding to the communication quality of the wireless transmission channel (IEEE802.11ad) is equal to or smaller than a threshold value (step S828). For example, if the data defect rate of the wireless transmission channel (IEEE802.11ad) is equal to or higher than a certain value, the control unit 180 can determine that the communication quality of the wireless transmission channel (IEEE802.11ad) is bad. If it is determined that the communication quality of the wireless transmission channel is not bad (step S828), the process returns to step S825.

Also, if it is determined that the communication quality of the wireless transmission channel is bad (step S828), the control unit 180 changes the type of the wireless transmission channel used in the transmission of the image data (step S829, S830). When the type of the wireless transmission channel is changed as described above, the control unit 180 notifies the information processing apparatus 200 (the receiver device) of the information relevant to the change of the wireless transmission channel, as necessary (step S829). For example, the control unit 180 transmits the information relevant to the change of the wireless transmission channel (for example, a timing to switch, designation of the wireless transmission channel, formats of image data before and after switch), to the information processing apparatus 200 (the receiver device), by using an RTSP control message (step S829).

Subsequently, the control unit 180 executes the control for changing the type of the wireless transmission channel used in the transmission of the image data (step S830). FIG. 6 illustrates an example that stops the transmission through the wireless transmission channel (IEEE802.11ad) used in the transmission of the image data, and instead switches to the transmission through the wireless transmission channel (IEEE802.11n) (step S830).

Note that, at the time of this switch, the control unit 180 may change the setting of the image encoding unit 120 in such a manner to change to apply a highly efficient encoding (compression) to the image data, and in such a manner to change the compression ratio according to the band.

For example, the uncompressed image data transmitted in IEEE802.11ad can be changed to the image data compressed and transmitted by H.264 in IEEE802.11n. Also, for example, the image data compressed and transmitted by using the rate of 40 Mbps in H.264 in IEEE802.11ad can be changed to the image data compressed and transmitted by using the rate of 10 Mbps of H.264 in IEEE802.11n. Also, for example, the image data of the resolution of 4K2K transmitted in IEEE802.11ad can be changed to the image data minimized to the resolution of the full HD (Full HD (high definition)) for transmission in IEEE802.11n. Note that the type of the highly efficient encoding in use is not limited to H.264.

Also, it is preferable that, at the time of switch of the wireless transmission channel, the image data transmitted and received after the switch is encoded in a decodable manner that does not depends on the data transmitted and received before the switch. That is, it is preferable that the image data that is transmitted after the switch to the wireless transmission channel of IEEE802.11n is encoded not depending on the image data transmitted through the wireless transmission channel of IEEE802.11ad. For example, it is assumed that the image data transmitted through the wireless transmission channel of IEEE802.11ad is encoded by using the highly efficient encoding of H.264. In this case, a frame of a specific type (for example, an instantaneous decoder refresh (IDR) frame) is transmitted immediately after the switch. The degradation of the communication quality of the wireless transmission channel of IEEE802.11ad is prevented from affecting the image data after the switch, by performing encoding as described above.

Note that the change of the encoding method, the change of the compression ratio, the insertion of the IDR frame, or the like may be applied only when the band of the wireless transmission channel changes significantly between before switch and after switch.

After the type of the wireless transmission channel used in the transmission of the image data is changed (step S830), the control unit 180 determines whether or not to end the currently executed transmission process of image data and sound data (step S831). Then, if it is determined to end the transmission process (step S831), the operation of the data transmission control process is ended. Note that the same determination criterion as step S825 may be used in this determination process (step S831).

Subsequently, the control unit 180 encodes the generated image data and sound data to execute the control for transmitting each of those data to the information processing apparatus 200 (the receiver device) via the second communication unit 160 (step S832). That is, the control unit 180 transmits the encoded image data and sound data to the information processing apparatus 200 (the receiver device) by using the wireless transmission channel of IEEE802.11n (step S832).

Subsequently, the control unit 180 acquires the communication quality of the wireless transmission channel of IEEE802.11ad (step S833). That is, the control unit 180 confirms the communication quality of the wireless transmission channel of IEEE802.11ad, by estimating the communication quality of the wireless transmission channel of IEEE802.11ad (step S833).

For example, the communication quality of the wireless transmission channel of IEEE802.11ad is estimated, by transmitting a certain amount of test data on the wireless transmission channel of IEEE802.11ad and acquiring data defect situation. As this test data, data that does not have a meaning (a Null data frame and a QoS (Quality of Service) Null frame, etc.) is transmitted, for example. Also, as the test data, data that is transmitted by using the wireless transmission channel of IEEE802.11n is duplicated and transmitted to the wireless transmission channel of IEEE802.11ad, for example. Note that, in a situation of a large test data defect amount, it is concerned that the test data have a large influence on the data transmission and reception of another terminal that operates on the same channel Hence, under such a situation, it is preferable that the test data size (bit rate) is reduced.

Subsequently, the control unit 180 determines whether or not the communication quality of the wireless transmission channel of IEEE802.11ad has recovered (step S834). That is, the control unit 180 determines whether or not the communication quality of the wireless transmission channel of IEEE802.11ad is equal to or higher than a threshold (step S834). If it is determined that the communication quality of the wireless transmission channel has not recovered (step S834), the process returns to step S831.

Also, if it is determined that the communication quality of the wireless transmission channel has recovered (step S834), the control unit 180 changes the type of the wireless transmission channel used in the transmission of the image data (step S835, S836). When the type of the wireless transmission channel is changed as described above, the control unit 180 notifies the information processing apparatus 200 (the receiver device) of the information relevant to the change of the wireless transmission channel, as necessary (step S835). This notification is the same as step S829, and thus the description will be omitted here.

Subsequently, the control unit 180 executes the control for changing the type of the wireless transmission channel used in the transmission of the image data (step S836), and returns to step S825. FIG. 6 illustrates an example in which the transmission through the wireless transmission channel (IEEE802.11n) used in the transmission of the image data is stopped, and instead the transmission is switched to the wireless transmission channel (IEEE802.11ad) (step S836).

Note that, at the time of this switch, the control unit 180 may change the setting of the image encoding unit 120 to change the compression ratio according to the band of the highly efficient encoding applied to the image data, in the same way as step S830. Also, the control unit 180 may change the process from the highly efficient encoding to a normal encode (for example, an encoding that does not use compression), in the same way as step S830.

Also, the encoding may be executed in such a manner that the image data after the switch does not depend on the image data before the switch.

As described above, the control unit 180 switches the wireless transmission channel of the image data, when the communication quality of the wireless transmission channel of the high frequency band (for example, IEEE802.11ad) becomes lower than a threshold. For example, the control unit 180 switches the wireless transmission channel of the image data from the wireless transmission channel of the high frequency band to the wireless transmission channel of the low frequency band (for example, IEEE802.11n). Also, at the time of the switch of the wireless transmission channel, the control unit 180 may perform at least one of changing of the encoding method of the image data, switching between use and non-use of the highly efficient encoding, and changing the type and the setting items (for example, parameters) of the highly efficient encoding. Also, the control unit 180 may encode the image data transmitted after the switch of the wireless transmission channel in a decodable manner that does not depend on the image data transmitted before the switch, and transmit it to the information processing apparatus 200.

[Exemplary Operation of Information Processing Apparatus (Receiver Device)]

FIG. 7 is a flowchart illustrating an example of the process procedure of the data reception control process by the information processing apparatus 200 (the receiver device) in the first embodiment of the present technology. FIG. 7 illustrates an example in which wireless communication is performed between the information processing apparatus 100 (the transmitter device) and the information processing apparatus 200 (the receiver device). Also, the data reception control process illustrated in FIG. 7 corresponds to the data transmission control process illustrated in FIG. 6.

Note that each process (steps S841 to S844) executed until the RTSP session is established is the same as each process (steps S811 to S814) illustrated in FIG. 5, and thus the description will be omitted here.

After the RTSP session is established (step S844), the control unit 280 determines whether or not to end the currently executed reception process of the image data and the sound data (step S845). Then, if it is determined to end the reception process (step S845), the operation of the data reception control process is ended. Note that, in this determination process (step S845), the same determination criterion as step S825 illustrated in FIG. 6 may be used. Also, in the same way as the example illustrated in FIG. 6, the determination process may be executed at another timing. For example, it may be performed at a timing at or after step S844.

Note that the data reception process (step S846) is the same as the data transmission process (step S815) illustrated in FIG. 5, and thus the description will be omitted here.

Subsequently, the control unit 280 determines whether or not a switch control message has been received from the information processing apparatus 100 (the transmitter device) (step S847). If the switch control message has not been received from the information processing apparatus 100 (the transmitter device) (step S847), the process returns to step S845.

Also, if the switch control message has been received from the information processing apparatus 100 (the transmitter device) (step S847), the control unit 280 executes the control for changing the type of the wireless transmission channel used in the transmission of the image data (step S848). FIG. 7 illustrates an example which stops the transmission through the wireless transmission channel (IEEE802.11ad) used in the transmission of the image data, and instead switches to the transmission through the wireless transmission channel (IEEE802.11n) (step S848), in the same way as FIG. 6.

Note that, at the time of this switch, the control unit 280 may execute a process such as re-initialization of the image decoding unit 220 in conformity with the format of the image data after the switch, as necessary.

Subsequently, the control unit 280 determines whether or not to end the currently executed reception process of the image data and the sound data (step S849). Then, if it is determined to end the reception process (step S849), the operation of the data reception control process is ended.

Note that the same determination criterion as step S825 illustrated in FIG. 6 may be used in the determination process (step S849).

Subsequently, the control unit 280 executes the control for outputting each data received from the information processing apparatus 100 (the transmitter device) (step S850). Specifically, the control unit 280 causes the image decoding unit 220 to decode the image data received via the second communication unit 240, and outputs this decoded image data from the image output unit 230 (step S850). Also, the control unit 280 causes the sound decoding unit 250 to decode the sound data received via the second communication unit 240, and outputs this decoded sound data from the sound output unit 260 (step S850). That is, the control unit 280 receives the image data and the sound data from the information processing apparatus 100 (the transmitter device), by using the wireless transmission channel of IEEE802.11n (step S850).

Subsequently, the control unit 280 determines whether or not a switch control message has been received from the information processing apparatus 100 (the transmitter device) (step S851). If the switch control message has not been received from the information processing apparatus 100 (the transmitter device) (step S851), the process returns to step S849.

Also, if the switch control message has been received from the information processing apparatus 100 (the transmitter device) (step S851), the control unit 280 executes the control for changing the type of the wireless transmission channel used in the transmission of the image data (step S852). FIG. 7 illustrates an example which stops the transmission through the wireless transmission channel (IEEE802.11n) used in the transmission of the image data, and instead switches to the transmission by the wireless transmission channel (IEEE802.11ad), in the same way as FIG. 6 (step S852).

Note that, at the time of this switch, the control unit 280 may execute a process such as re-initialization of the image decoding unit 220 in conformity with the format of the image data after the switch, as necessary.

As described above, even when the communication quality of the wireless transmission channel used in the transmission of the image data degrades temporarily, the wireless transmission channel is switched to the wireless transmission channel of another type, by switching the type of the wireless transmission channel automatically. This prevents the image output by the receiver device from being interrupted, and prevents the deterioration of the user experience.

For example, the communication quality of the wireless transmission channel of IEEE802.11ad is always checked, and the wireless transmission channel is temporarily switched to the wireless transmission channel of IEEE802.11n, when the communication quality deteriorates. Thereby, even when the communication quality of the wireless transmission channel of IEEE802.11ad is unstable, the defect of the image displayed on the image output unit 230 is reduced to the minimum.

[Example in which Image Data for Displaying Same Image is Simultaneously Transmitted by Using Plurality of Types of Wireless Transmission Channels]

In FIGS. 6 and 7, an example in which the wireless transmission channel for transmitting the image data is changed according to the communication quality of the wireless transmission channel has been illustrated. Here, it is envisaged that, in the example illustrated in FIGS. 6 and 7, switching takes time, and a switch timing is delayed, because the wireless transmission channel is switched. In this case, it is concerned that the defect of the image data continues for a time needed for the switching or for a delay time of the timing.

Thus, here, an example is illustrated in which the image data for displaying the same image is simultaneously transmitted from the transmitter device to the receiver device, by using the wireless transmission channel of a plurality of types (two or more types). Here, the encoding method of the image data of transmission target (the image data for displaying the same image) needs to be set according to the band of the wireless transmission channel of each type. Also, when the highly efficient encoding is employed as the encoding method of the image data of transmission target (the image data for displaying the same image) for example, setting parameters need to be set according to the band of the wireless transmission channel of each type.

[Exemplary Operation of Information Processing Apparatus (Transmitter Device)]

First, an exemplary operation of the information processing apparatus 100 (the transmitter device) will be described. Note that an exemplary operation of the information processing apparatus 100 (the transmitter device) performed when the image data for displaying the same image is simultaneously transmitted by using a plurality of types of wireless transmission channels is substantially the same as the example illustrated in FIG. 4, and therefore its depiction is omitted, and here only points different from FIG. 4 will be described.

When the image data for displaying the same image is simultaneously transmitted, by using two types of wireless transmission channels, both of the first communication unit 130 and the second communication unit 160 are operated simultaneously. Then, the image data for displaying the same image is simultaneously transmitted to two types of wireless transmission channels (IEEE802.11ad, IEEE802.11n) from both of the communication units (the first communication unit 130 and the second communication unit 160) (step S805 illustrated in FIG. 4). Note that the sound data is transmitted from the second communication unit 160 to one type of the wireless transmission channel (IEEE802.11n).

Note that, when the types of the wireless transmission channels in use are equal to or more than three, the image data for displaying the same image may be simultaneously transmitted from three or more communication units, in the same way as when using two types of wireless transmission channels (step S805 illustrated in FIG. 4).

As described above, the control unit 180 simultaneously transmits the image data for outputting the same image to the information processing apparatus 200, by using both of the wireless transmission channel of the high frequency band and the wireless transmission channel of the low frequency band.

[Exemplary Operation of Information Processing Apparatus (Receiver Device)]

Figure 8:
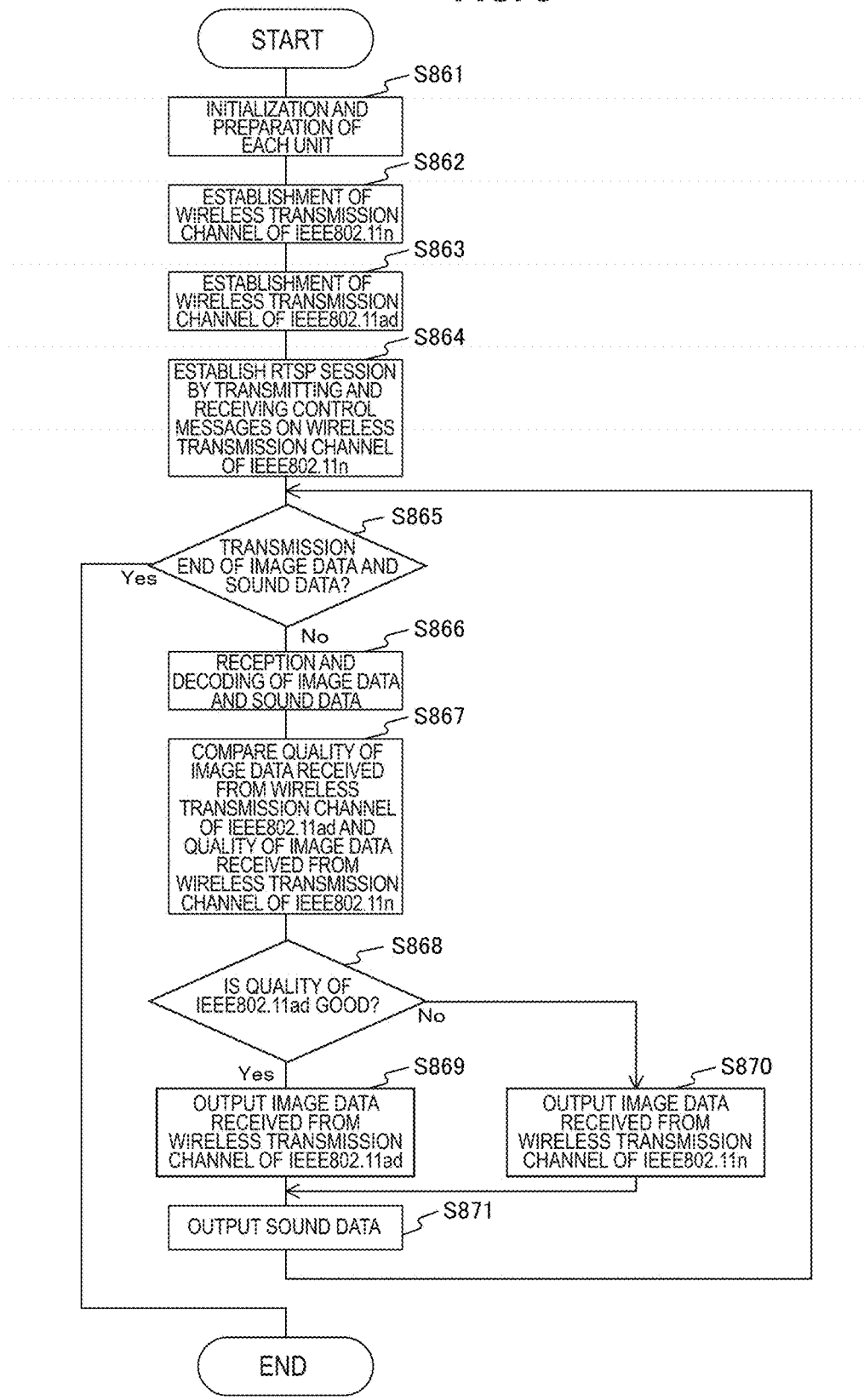
FIG. 8 is a flowchart illustrating an example of a process procedure of a data reception control process by an information processing apparatus 200 (a receiver device) in the first embodiment of the present technology.

FIG. 8 is a flowchart illustrating an example of the process procedure of the data reception control process by the information processing apparatus 200 (the receiver device) in the first embodiment of the present technology. FIG. 8 illustrates an example in which wireless communication is performed between the information processing apparatus 100 (the transmitter device) and the information processing apparatus 200 (the receiver device). Also, FIG. 8 illustrates an example of the data reception control process for receiving data simultaneously from two types of wireless transmission channels at the receiver device.

Note that each process (steps S861 to S864) executed until the RTSP session is established is the same as each process (steps S811 to S814) illustrated in FIG. 5, and thus the description will be omitted here.

After the RTSP session is established (step S864), the control unit 280 determines whether or not to end the currently executed reception process of the image data and the sound data (step S865). Then, if it is determined to end the reception process (step S865), the operation of the data reception control process is ended. Note that the same determination criterion as step S825 illustrated in FIG. 6 may be used in this determination process (step S865). Also, in the same way as the example illustrated in FIG. 6, the determination process may be executed at another timing. For example, it may be performed at a timing at or after step S864.

Subsequently, the control unit 280 executes the control for decoding each data received from the information processing apparatus 100 (the transmitter device) (step S866). Specifically, the control unit 280 inputs, into the image decoding unit 220, both of the image data received via the first communication unit 210 and the image data received via the second communication unit 240 (step S866), for the purpose of decoding. Also, the control unit 280 inputs, into the sound decoding unit 250, the sound data received via the second communication unit 240 (step S866), for the purpose of decoding.

Subsequently, the control unit 280 compares the quality of the image data received via the first communication unit 210 (the image data (the image signal) obtained by decoding) with the quality of the image data received via the second communication unit 240 (the image data (the image signal) obtained by decoding) (step S867). That is, the control unit 280 compares the quality of the image data received by using the wireless transmission channel of IEEE802.11ad with the quality of the image data received by using the wireless transmission channel of IEEE802.11n (step S867).

Here, the quality of the image data (the image signal) obtained by decoding is the information that indicates the degree of incompleteness of the image data, for example. For example, when a part of the image is lacking due to the incompleteness of the image data, when a part of the image is disturbed due to the incompleteness, or when the image is not output at all due to the incompleteness, the quality of the image data (the image signal) obtained by decoding is determined to be bad.

Here, a method to detect incompleteness of data at the information processing apparatus 200 (the receiver device) side in the case of Wi-Fi certified miracast will be described. For example, the received real-time transport protocol (RTP) packet is sorted in the order of sequence number given to each packet, and it is determined that the image data is incomplete when there is a vacant sequence number. Also, when the value of continuity counter included in the received MPEG (Moving Picture Experts Group)-2 TS (Transport Stream) packet is checked and the number increases discontinuously (except for a case of wrapping around), it is determined that the data is incomplete.

It is assumed that, as a result of the comparison, it is determined that the quality of the image data received and obtained via the first communication unit 210 (the image data received and obtained via the wireless transmission channel of IEEE802.11ad) is good (step S868). In this case, the control unit 280 executes the control for setting the image data as the output target (step S869). That is, the control unit 280 outputs the image data (the image data received and obtained via the first communication unit 210) from the image decoding unit 220 to the image output unit 230, and outputs the image data from the image output unit 230 (step S869). In this case, the image data received and obtained via the second communication unit 240 (the image data received and obtained via the wireless transmission channel of IEEE802.11n) is not used.

On the other hand, it is assumed that it is determined that the quality of the image data received and obtained via the second communication unit 240 (the image data received and obtained via the wireless transmission channel of IEEE802.11n) is good (step S868). In this case, the control unit 280 executes the control for setting the image data as the output target (step S870). That is, the control unit 280 outputs the image data (the image data received and obtained via the second communication unit 240) from the image decoding unit 220 to the image output unit 230, and outputs the image data from the image output unit 230 (step S870). In this case, the image data received and obtained via the first communication unit 210 (the image data received and obtained via the wireless transmission channel of IEEE802.11ad) is not used.

Subsequently, the control unit 280 outputs the sound data received via the second communication unit 240 (the sound data decoded by the sound decoding unit 250) from the sound output unit 260 (step S871).

Here, it is also envisaged that, as a result of the comparison of the qualities of the image data, both of the qualities are the same level. For example, when the image incompleteness situation is the same in both cases, it is determined that both of the qualities are the same. In this case, the image data of output target can be selected in accordance with a predetermined rule. For example, a high resolution image may be selected, and an image of a high bit rate image data may be selected.

Also, in the following as well, the information processing apparatus 200 (the receiver device) repeatedly executes the above operation. Note that the timing to confirm the quality of the image data may be periodic or non-periodic. For example, when the quality of the image data is confirmed on a regular basis, the quality may be confirmed for each frame of the image data, and the quality of the image data may be confirmed at constant intervals.

Note that, when the types of the wireless transmission channels in use are equal to or more than three, the control unit 280 compares the qualities of the three or more image data with each other (step S867). Then, as a result of the comparison, the control unit 280 selects the image of the highest quality image data (step S868), and displays the selected image on the image output unit 230 (corresponding to step S869, S870).

As described above, the control unit 280 executes the control for simultaneously receiving the image data for outputting the same image, from the information processing apparatus 100, by using both of the wireless transmission channel of the high frequency band and the wireless transmission channel of the low frequency band. Also, in this case, the control unit 280 selects a high quality image data as the output target image data from among the received multiple image data.

As described above, the same image is simultaneously transmitted by using a plurality of types of wireless transmission channels, so that even when one of the communication qualities of the wireless transmission channels deteriorates, the image data received by using another wireless transmission channel may be used. Thereby, the image output by the receiver device is prevented from being interrupted, and the degradation of the quality of the output target image is reduced to the minimum.

[Example in which Wireless Transmission Channel of Optimal Type is Selected Automatically]

Although an example using two types of wireless transmission channels including IEEE802.11ad and IEEE802.11n has been described mainly in the above, three or more types of wireless transmission channels may be used as described above. For example, it may be such that the image data is transmitted by using the wireless transmission channel of IEEE802.11ad, and the sound data is transmitted by using the wireless transmission channel of IEEE802.11n, and the control signal is transmitted by using the wireless transmission channel of IEEE802.11ah. Also, IEEE802.11n of 5 GHz band may be replaced by IEEE802.11ac. Further, when the wireless transmission channel of IEEE802.11ad is used, a function for connecting one transmitter device to two or more receiver devices to transmit the same image and sound data to the two or more receiver devices may be combined to reduce the data loss. As described above, when a plurality of types of wireless transmission channels are used, it is important to appropriately select the type of the wireless transmission channel used in the transmission of the image data and the sound data. For example, it is also conceived that the type of the wireless transmission channel used in the transmission of the image data and the sound data is set to an optimal one automatically.

Thus, here, an example is illustrated in which the characteristics of each type of wireless transmission channels and the characteristics required in data transmission are defined in advance, and the type of the wireless transmission channel for use is selected on the basis of these information.

[Element Example Relevant to Characteristic of Type of Wireless Transmission Channel and Data Requirement]

FIG. 9 is a diagram illustrating the element example considered when selecting the wireless transmission channel by the communication system 10 in the first embodiment of the present technology.

Note that the element example illustrated in FIG. 9 is an example, and another element may be used. Also, these may be defined in advance by someone, or may be actually measured and estimated by the transmitter device and the receiver device at the time of data communication.

[Characteristic Example Regarded as Important when Transmitting Data]

FIG. 10 is a diagram illustrating an example of the characteristics regarded as important at the time of data communication by the communication system 10 in the first embodiment of the present technology.

FIG. 10 *a* illustrates an example of characteristics regarded as important, with respect to the transmission of the image data, the sound data, and the control data. In FIG. 10 *a*, a double circle indicates that the characteristic is regarded as very important, and a single circle indicates that the characteristic is regarded as important, and a bar (-) indicates that the characteristic is not regarded as important so much.

Here, with reference to FIG. 10 *a*, characteristics required for the transmission of the sound data will be described. For example, when the sound data is transmitted, the value required for A (the maximum transmission speed (the transmitter device side)) and C (the average transmission speed (the transmitter device side)) is low (for example, 128 Kbps). However, defect of sound data and delay of transmission directly result in interruption and delay of sound. Hence, E (packet error rate (PER)) needs to be as small as possible, and G (characteristic of data defect) is preferred to be discontinuous, and I (transmission delay) is preferred to be small desirably.

FIG. 10 *b* illustrates an example of characteristics of each of the wireless transmission channels of IEEE802.11ad, IEEE802.11n (which uses 5 GHz band), and IEEE802.11n (which uses 2.4 GHz band).

Here, with reference to FIG. 10 *b*, the wireless transmission channel of IEEE802.11ad will be described. For example, in the case of the wireless transmission channel of IEEE802.11ad, the values of A to D (the maximum transmission speed (the transmitter device side, the receiver device side), the average transmission speed (the transmitter device side, the receiver device side)) are generally very high (for example, 1 Gbps or more), and the value of I (the transmission delay) is small. However, for example, an obstacle existing between the devices results in characteristics in which the value of E (the packet error rate (PER)) is high, and G (the characteristic of the data defect) is continuously defective. Also, it is possible that, as the number of connection devices increases, the value of J (fluctuation of transmission time) becomes large.

As described above, the optimal wireless transmission channel can be selected, when the type of the wireless transmission channel is selected, by knowing the characteristics of each type of the wireless transmission channels and the requirement of the transmission data. For example, in the transmission of the sound data, the wireless transmission channel of the type of the lowest E (the packet error rate) and I (the transmission delay) may be set to be used. The optimal wireless transmission channel can be selected, as the wireless transmission channel used in the sound data, by setting as described above. Also, even when the types of the wireless transmission channels have increased, and even when the types of the transmission data have increased (for example, even when data other than the image and the sound is newly added), the optimal wireless transmission channel can be selected.

Also, the type of the wireless transmission channel that maximizes the user experience can be selected automatically without user's labor, by combining with a selection method to select the type of the wireless transmission channel automatically. Thereby, even when the types of the wireless transmission channels have increased, the optimal wireless transmission channel can be selected.

As described above, the control unit 180 selects the wireless transmission channel used in the transmission of the data, from among a plurality of wireless transmission channels, on the basis of the characteristics of a plurality of wireless transmission channels and the information relevant to the transmission target data.

2. Second Embodiment

In the first embodiment of the present technology, an example has been illustrated in which each data (the image data and the sound data) is transmitted by using a plurality of types of wireless transmission channels.

Here, when a plurality of types of wireless transmission channels are used, different IP addresses are assigned for respective wireless transmission channels, depending on the implementation method, in some cases. For example, it is assumed that two types of wireless transmission channels including the wireless transmission channel of IEEE802.11ad and the wireless transmission channel of IEEE802.11n are used. In this case, for example, 192.168.1.1 is assigned as the IP address of the wireless transmission channel of IEEE802.11ad of the transmitter device side, and 192.168.2.1 is assigned as the address of the wireless transmission channel of IEEE802.11n, in some cases. Also, in this case, for example, 192.168.1.2 is assigned as the IP address of the wireless transmission channel of IEEE802.11ad of the receiver device side, and 192.168.2.2 is assigned as the IP address of the wireless transmission channel of IEEE802.11n, in some cases. As described above, two IP addresses are assigned to the same device, in some cases. That is, different IP addresses are used for the wireless transmission channel of the high frequency band and the wireless transmission channel of the low frequency band in some cases.

Also, in the specification of Wi-Fi certified miracast, it is assumed that the same wireless transmission channel is used for the wireless transmission channel for transmitting the image data and the sound data and the wireless transmission channel for transmitting and receiving the control message. Hence, for example, as opposed to a case in which the image data is transmitted at 60 GHz, and the control message is exchanged at 2.4 GHz/5 GHz, the control message is unable to be transmitted and received by using a different wireless transmission channel from the image data and the sound data. Thus, a generation method of RTSP session for exchanging control messages needs to be established newly.

Also, the control message defined in Wi-Fi certified miracast is not created on the assumption that transmission is performed by using a plurality of IP addresses. Hence, in a case of implementation in which different IP addresses are assigned for respective wireless transmission channels, it is possible that the specification of Wi-Fi certified miracast is unable to be applied as it is.

As described above, in the specification of Wi-Fi certified miracast, a case is not considered in which the IP address of the transmission of the image data and the sound data and the IP address of the transmission of the control message are different. Also, when the image data and the sound data are transmitted by using a plurality of types of wireless transmission channels, a plurality of IP addresses are used, and the specification of Wi-Fi certified miracast is unable to be applied as it is.

Thus, in the second embodiment of the present technology, the extended example of the control message of Wi-Fi certified miracast will be described. That is, the method for generating the RTSP session for exchanging the control messages, and the extension method of the RTSP message defined in Wi-Fi certified miracast, when a plurality of IP addresses are used, will be described.

Also, in the second embodiment of the present technology, an example will be described in which two types of wireless transmission channels including the wireless transmission channel of IEEE802.11ad and the wireless transmission channel of IEEE802.11n are used, and the wireless transmission channel of IEEE802.11n of little data loss is used for the transmission and reception of the control message. Note that, in many cases, information of IP address is acquired from a dynamic host configuration protocol (DHCP) server and a DHCP client. Hence, all of the IP addresses assigned to two types of wireless transmission channels are known by both of the transmitter device side and the receiver device side in advance.

Also, in Wi-Fi certified miracast, the protocol which is referred to as RTSP is used for the transmission and reception of the control message. Basically, one RTSP session corresponds to one stream. Although, RTSP is designed to operate on TCP, one RTSP session or a plurality of RTSP sessions can be generated on one TCP session.

Thus, in the description of the second embodiment of the present technology, the generation methods of the RTSP session are focused and classified into three cases. Also, with respect to each case, change from the current specification of Wi-Fi certified miracast will be described.

[Example in which Two TCP Sessions are Generated on Wireless Transmission Channel of IEEE802.11n, and RTSP Sessions are Generated One by One on Each of TCP Sessions]

Figure 11:
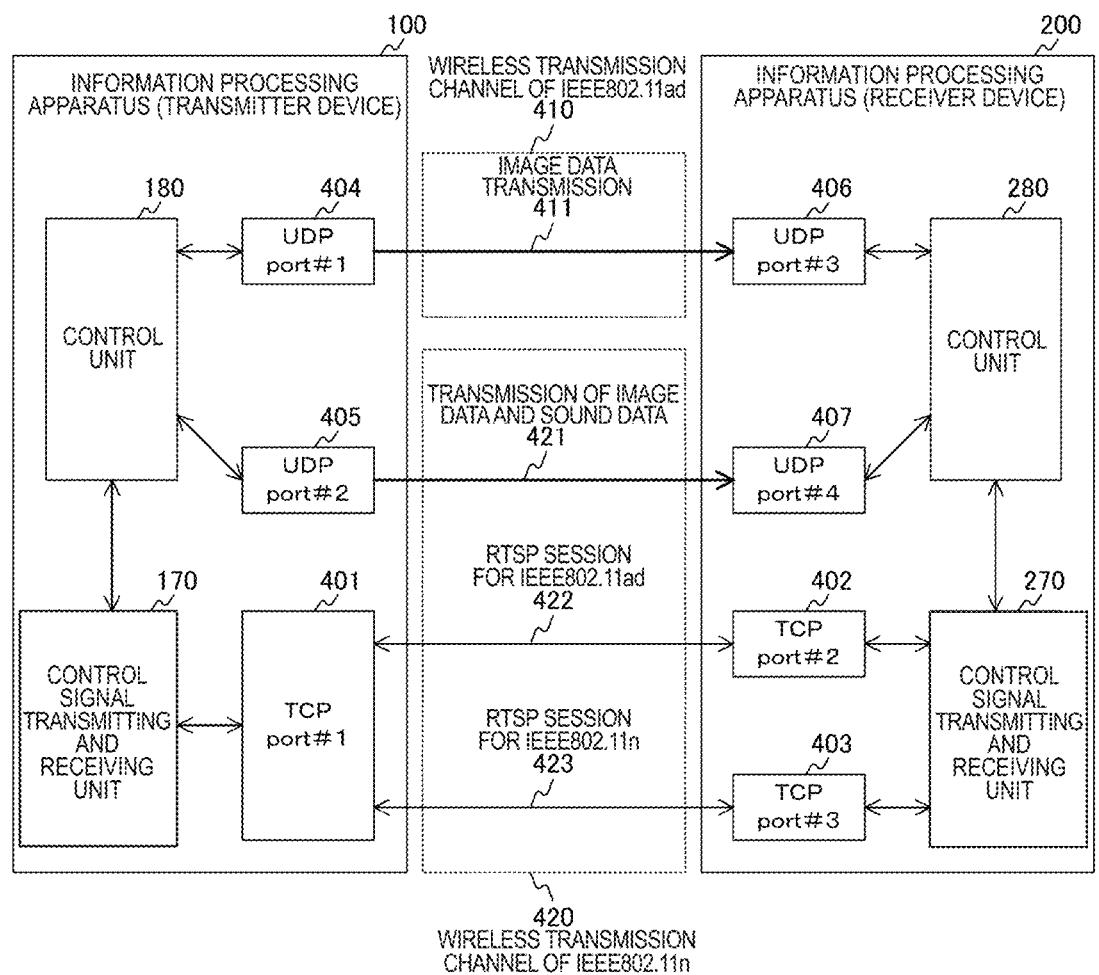
FIG. 11 is a diagram illustrating communication example by a communication system 10 in a second embodiment of the present technology.

FIG. 11 is a diagram illustrating the communication example by the communication system 10 in the second embodiment of the present technology. Note that the configurations of the information processing apparatuses 100 and 200 that configures the communication system 10 are the same as ones illustrated in FIGS. 2 and 3. Hence, the detailed description of the configurations of the information processing apparatuses 100 and 200 will be omitted here. Also, FIG. 11 illustrates the configurations illustrated in FIGS. 2 and 3, omitting a part thereof. Also, the same is applied to FIGS. 12 and 16.

Also, in FIG. 11, a wireless transmission channel 410 of IEEE802.11ad is schematically illustrated with a rectangular dotted line, and a wireless transmission channel 420 of IEEE802.11n is schematically illustrated with a rectangular dotted line. Also, FIG. 11 schematically illustrates each port. Specifically, a TCP port #1 (401), a TCP port #2 (402), a TCP port #3 (403), a UDP port #1 (404), a UDP port #2 (405), a UDP port #3 (406), and a UDP port #4 (407) are illustrated as each port.

Also, FIG. 11 illustrates an example in which the stream on the wireless transmission channel 410 of IEEE802.11ad and the stream on the wireless transmission channel 420 of IEEE802.11n are treated as different ones, and one RTSP session is generated for each. Here, in Wi-Fi certified miracast, M1 to M7 messages are exchanged when the RTSP session is generated. Also, in the example illustrated in FIG. 11, the M1 to M7 messages are repeated the number of wireless transmission channels (two in the example illustrated in FIG. 11). Note that, in the example illustrated in FIG. 11, the content change of the message is unnecessary particularly.

For example, the image data (the image signal) (indicated by the arrow 411) is transmitted in the stream on the wireless transmission channel 410 of IEEE802.11ad. Also, the sound data (the image data in some cases) (indicated by the arrow 421) is transmitted in the stream on the wireless transmission channel 420 of IEEE802.11n.

Also, each of the RTSP sessions for controlling these two streams is generated on the wireless transmission channel 420 of IEEE802.11n. That is, the RTSP session 422 for IEEE802.11ad is generated by using the TCP port #1 (401) and the TCP port #2 (402). Also, the RTSP session 423 for IEEE802.11n is generated by using the TCP port #1 (401) and the TCP port #3 (403). Although one TCP port of the transmitter device side is sufficient, and thus FIG. 11 illustrates an example using only the TCP port #1 (401), a plurality of TCP ports may be used, depending on TCP ports of the receiver device side.

Also, with respect to the RTSP control command, the respective transmissions on the wireless transmission channel 410 of IEEE802.11ad and the wireless transmission channel 420 of IEEE802.11n may be controlled separately, and may be operated in conjunction with each other. Note that the RTSP control command is PAUSE, PLAY, TEARDOWN, and WFD_standby, for example.

For example, it is assumed that a PAUSE command is issued in the RTSP session corresponding to the wireless transmission channel 410 of IEEE802.11ad. In this case, only the transmission stream on the wireless transmission channel 410 of IEEE802.11ad may be temporarily stopped. Also, the transmission streams of both of the wireless transmission channel 410 of IEEE802.11ad and the wireless transmission channel 420 of IEEE802.11n may be temporarily stopped.

Note that, when the transmission streams of two types of wireless transmission channels are temporarily stopped, the control units 180, 280 need to execute the control for applying the content of the RTSP message sent through a certain wireless transmission channel, to the transmitted data on all wireless transmission channels. Also, if a session ID included in the RTSP message is made the same in all RTSP sessions, operations performed in conjunction is made clearer.

Also, when one of the RTSP sessions is disconnected in the middle, it is desirable that connection is attempted repeatedly. At this, it may be such that an M1 request/response and an M2 request/response are omitted, and the control message is exchanged from an M3 request. Thereby, time necessary for reconnection is reduced.

As described above, the information processing apparatus 100 transmits multiple data to the information processing apparatus 200, by using both of the wireless transmission channel of the high frequency band and the wireless transmission channel of the low frequency band. In this case, the control units 180, 280 generate a plurality of TCP sessions on the wireless transmission channel of the low frequency band, and generate a plurality of RTSP sessions for transmitting multiple data on each of the TCP sessions.

[Example in which One TCP Session is Generated on Wireless Transmission Channel of IEEE802.11n, and One RTSP Session is Generated Thereon]

Figure 12:
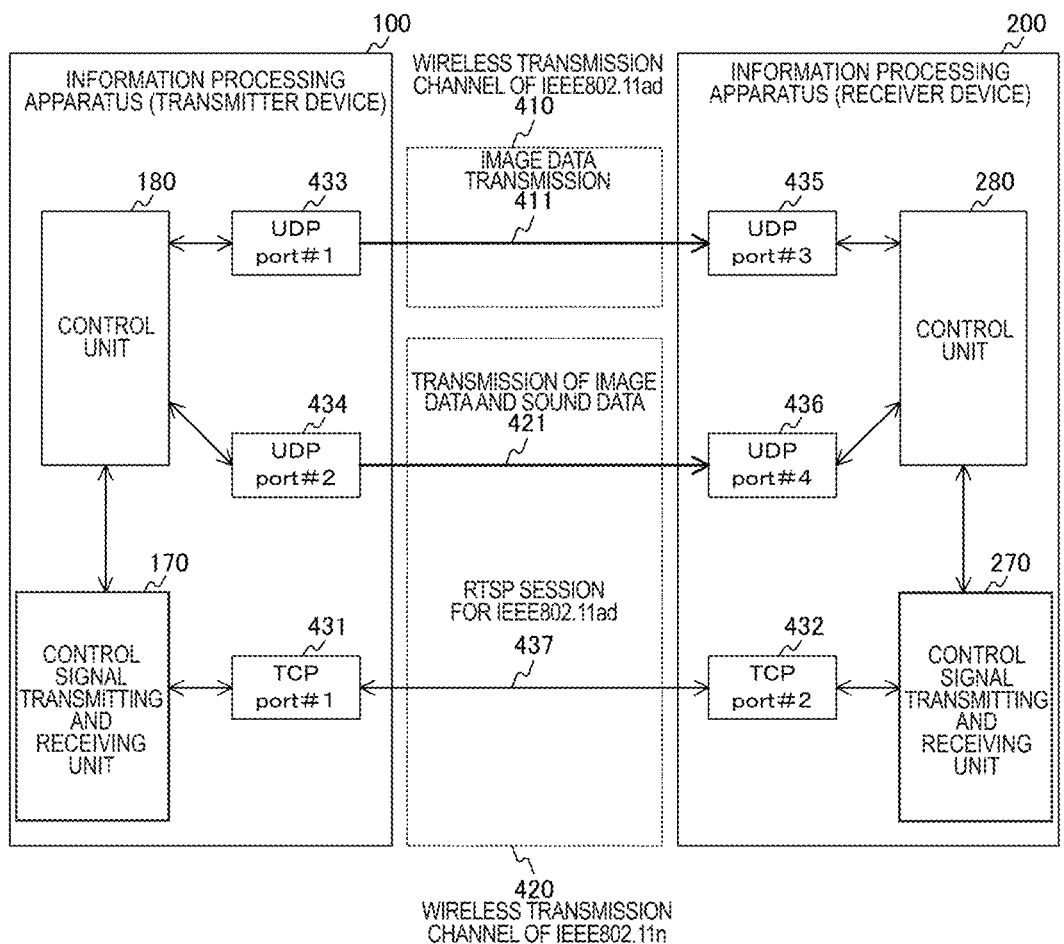
FIG. 12 is a diagram illustrating communication example by a communication system 10 in a second embodiment of the present technology.

FIG. 12 is a diagram illustrating the communication example by the communication system 10 in the second embodiment of the present technology.

In FIG. 12, the wireless transmission channel 410 of IEEE802.11ad is schematically illustrated with a rectangular dotted line, and the wireless transmission channel 420 of IEEE802.11n is schematically illustrated with a rectangular dotted line, in the same way as FIG. 11. Also, in FIG. 12, each port is schematically illustrated in the same way as FIG. 11. Specifically, a TCP port #1 (431), a TCP port #2 (432), a UDP port #1 (433), a UDP port #2 (434), a UDP port #3 (435), and a UDP port #4 (436) are illustrated as each port.

Also, FIG. 12 illustrates an example in which the stream on the wireless transmission channel 410 of IEEE802.11ad and the stream on the wireless transmission channel 420 of IEEE802.11n are treated as one, and only one RTSP session is generated.

[Change Example of Message]

FIGS. 13 and 14 are diagrams illustrating change examples of the message exchanged by devices that configure the communication system 10 in the second embodiment of the present technology. That is, change examples of messages (M3 response message, M4 request message, M6 request message, and M6 response message) for controlling multiple transmitted data on one TCP session are illustrated. Note that, FIG. 13 illustrates an example of the change of the messages (an example that separates with a comma), and FIG. 14 illustrates another example (an example that provides a new line).

Also, in FIGS. 13 and 14, additional parts or changed parts are illustrated and surrounded by rectangles 501 to 508, 511 to 515 of dotted lines.

[With Regard to Port Number in RTSP Message]

Here, port numbers in the RTSP message will be described.

[With Regard to wfd_content_protection Parameter of M3 Response Message]

Here, description will be made with reference to FIG. 13 *a* and FIG. 14 *a*.

This port number indicates a TCP port number that the receiver device awaits for key exchange of HDCP. For example, when a plurality of wireless transmission channels exist, it is conceived to perform the key exchange of HDCP on each wireless transmission channel Hence, the port numbers are needs to be recited according to the number of wireless transmission channels. For example, as illustrated in the rectangular dotted line 501 of FIG. 13 *a*, the port numbers are added and recited by the number of wireless transmission channels.

[With Regard to wfd_client_rtp_ports Parameter in M3 Response and M4 Request]

Here, description will be made with reference to FIG. 13 *a, b* and FIG. 14 *a, b*.

In the specification of Wi-Fi certified miracast, two port numbers are input with a separator space in between. For example, two port numbers "1028" and "0" are input with a separator space in between as in "1028 0".

Also, the specification of Wi-Fi certified miracast allows that only image stream is transmitted from the one transmitter device (source device) to the receiver device (primary sink), and that only sound stream is transmitted to another receiver device (secondary sink).

Hence, the first one of two port numbers of wfd_client_rtp_ports parameter represents a UDP port number that the primary sink uses in the RTP stream reception. Also, the second one represents a UDP port number that the secondary sink uses in the RTP stream reception.

When the RTSP message is exchanged between the source device and primary sink, the value of the first UDP port is set to non-zero, and the value of the second UDP port is set to zero. On the other hand, when the RTSP message is exchanged between the source device and the secondary sink, the value of the first UDP port is set to zero, and the value of the second UDP port is set to non-zero. Note that, when the receiver device is one (that is, when one device receives both streams of image and sound), the same operation as the case of primary sink is performed.

Also, when the wireless transmission channels are two or more, each of the first UDP port number and the second UDP port number needs to be increased by the number of wireless transmission channels.

[With Regard to Value of client_port in M6 Request and M6 Response]

Here, description will be made with reference to FIG. 13 *c, d* and FIG. 14 *c, d*.

This value indicates a UDP port number used when the receiver device receives the RTP stream. That is, this value is basically the same as the value in the above wfd_client_rtp_ports.

Note that, in the specification of Wi-Fi certified miracast, control information by the RTCP is exchanged optionally. In RTCP communication, a port number obtained by adding one to the RTP port number is used. Thus, when the receiver device complies with the RTCP, two consecutive values separated with a hyphen are written as in "1028-1029", and the first value is associated with the RTP, and the second value is associated with the RTCP. Also, when the receiver device does not comply with the RTCP, the hyphen and the second integer are not written.

[With Regard to Value of server_port in M6 Response]

Here, description will be made with reference to FIG. 13 *d* and FIG. 14 *d*.

This value indicates a UDP port number used when the transmitter device transmits the RTP stream. Note that, in the same way as the above client_port, when the transmitter device uses the RTCP, two consecutive values separated with a hyphen are written as in "5000-5001", and the first value is associated with the RTP, and the second value is associated with the RTCP. Also, when the transmitter device does not comply with the RTCP, or when the transmitter device complies and the receiver device does not comply with the RTCP, the hyphen and the second integer are not written.

Although FIG. 13 has illustrated an example in which each newly added value is separated with a comma, it may be separated on the basis of another rule, for example. For example, it may be separated by using colon, semicolon, period, + symbol, slash, or space.

[Sequence Chart Example]

Figure 15:
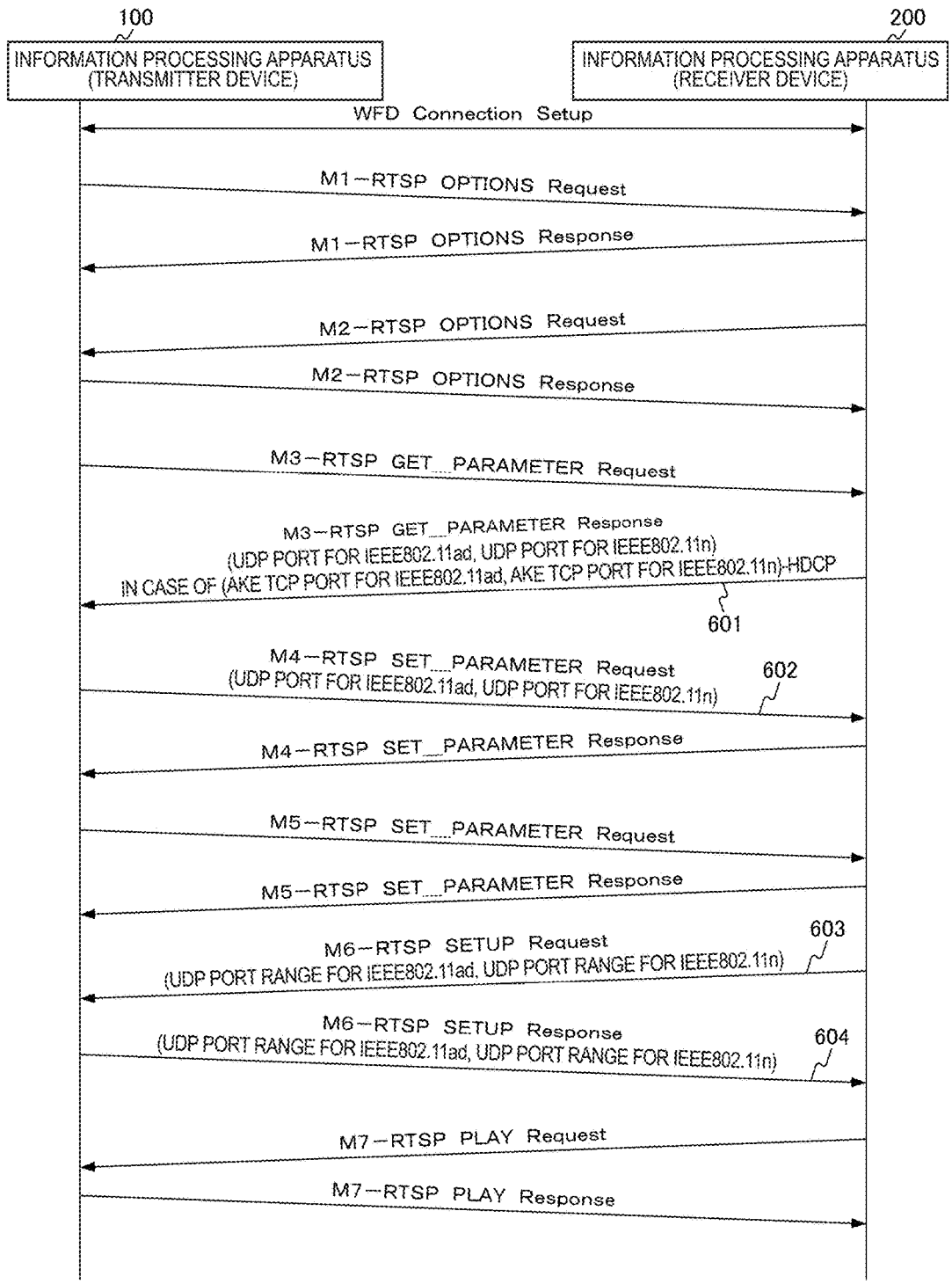
FIG. 15 is a sequence chart illustrating an exemplary communication process between devices that configure a communication system 10 in the second embodiment of the present technology.

FIG. 15 is a sequence chart illustrating an exemplary communication process between devices that configure the communication system 10 in the second embodiment of the present technology. Note that FIG. 15 illustrates an exemplary communication process when the M1 to M7 messages (including the messages illustrated in FIGS. 13 and 14) are exchanged between the information processing apparatus 100 and the information processing apparatus 200.

In the example illustrated in FIG. 15, the messages illustrated in FIG. 13 *a* and FIG. 14 *a* are messages corresponding to the arrow 601. Also, the messages illustrated in FIG. 13 *b* and FIG. 14 *b* are messages corresponding to the arrow 602. Also, the messages illustrated in FIG. 13 *c* and FIG. 14 *c* are messages corresponding to the arrow 603. Also, the messages illustrated in FIG. 13 *d* and FIG. 14 *d* are messages corresponding to the arrow 604.

As illustrated in FIGS. 13 and 14, part of the M1 to M7 messages for generating the RTSP session need to be changed. Specifically, the M3 response message, the M4 request message, the M6 request message, and the M6 response message need to be changed. Also, these messages include UDP port numbers with which the receiver device receives the image data and the sound data.

For example, when a plurality of types of wireless transmission channels are used, a UDP port number corresponding to each wireless transmission channel needs to be included into each message. In the same way, the M6 response message declares a UDP port number with which the transmitter device transmits the image data and the sound data, and in the same way as well in this case, a UDP port number corresponding to each wireless transmission channel needs to be included into the M6 response message.

Also, when the content protection mechanism by HDCP is used, the M3 response message transmitted by the receiver device needs to be changed. For example, the M3 response message includes a TCP port number that the receiver device side uses at the time of authentication and key interchange (AKE).

Also, when a plurality of types of wireless transmission channels are used, the AKE needs to be performed on each wireless transmission channel, and thus all of the TCP port numbers that the receiver device uses in the AKE need to be included in the M3 response message.

Note that the change method illustrated in FIGS. 13 and 14 is an example, and is not limited thereto.

Here, the RTSP control commands, such as PAUSE, PLAY, TEARDOWN, WFD_standby have an influence on transmission on both of the wireless transmission channel 410 of IEEE802.11ad and the wireless transmission channel 420 of IEEE802.11n. For example, when a PAUSE command is issued, both of the transmitted data on the wireless transmission channel 410 of IEEE802.11ad and the transmitted data on the wireless transmission channel 420 of IEEE802.11n are stopped temporarily.

As described above, the information processing apparatus 100 transmits multiple data to the information processing apparatus 200, by using both of the wireless transmission channel of the high frequency band and the wireless transmission channel of the low frequency band. In this case, the control units 180, 280 generate one TCP session on the wireless transmission channel of the low frequency band, and generate one RTSP session for transmitting multiple data on the TCP session. Also, when generating one RTSP session, the control unit 180 additionally writes a port number relevant to the wireless transmission channel used in transmitting multiple data, by separating the RTSP message with one of comma, colon, semicolon, period, + symbol, slash, and space. Also, when the information processing apparatus 200 complies with the RTCP, the control unit 180 writes two consecutive values separated with a hyphen as the UDP port number with respect to client_port in the M6 request message and the M6 response message and server_port in the M6 response message, and the first value is associated with the RTP, and the second value is associated with the RTCP.

[Example that Generates One TCP Session on Wireless Transmission Channel of IEEE802.11n and Generates Two RTSP Sessions Thereon]

Figure 16:
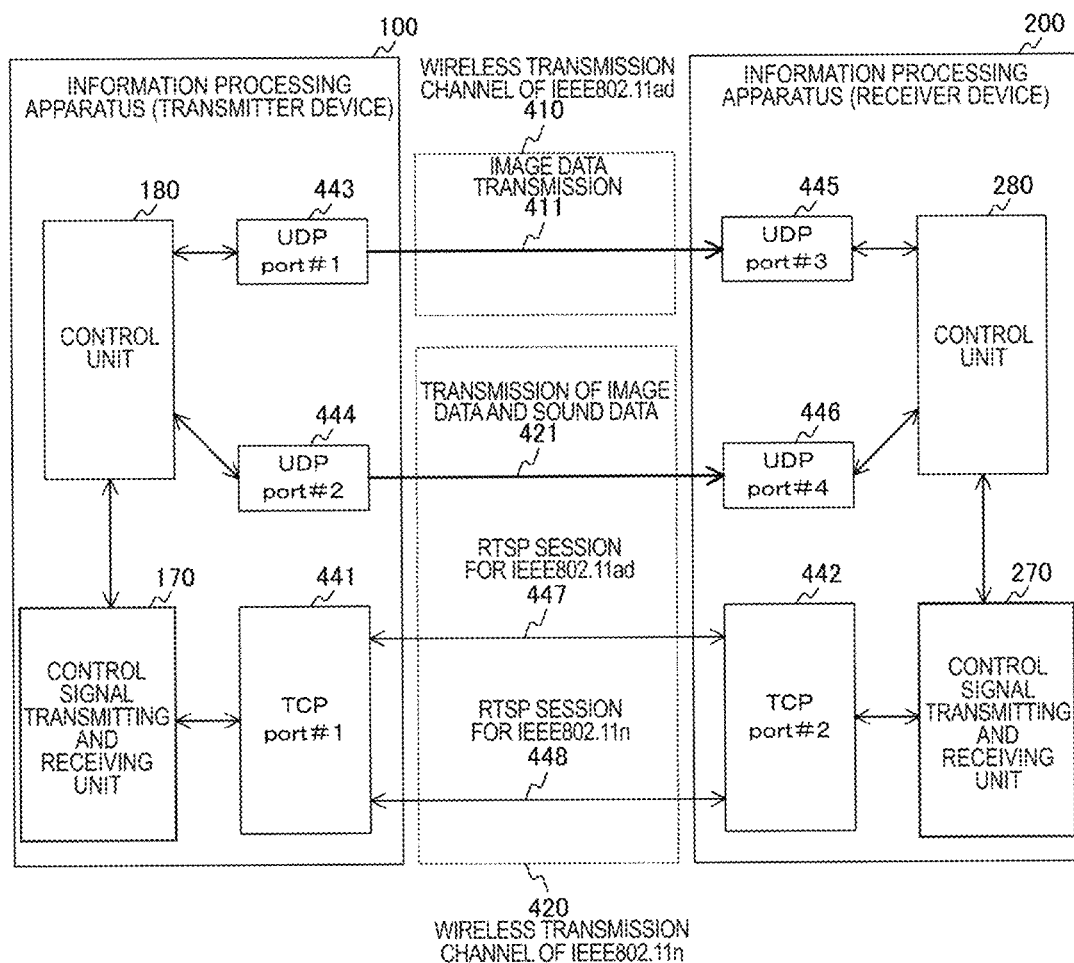
FIG. 16 is a diagram illustrating a communication example by a communication system 10 in the second embodiment of the present technology.

FIG. 16 is a diagram illustrating a communication example by the communication system 10 in the second embodiment of the present technology.

In FIG. 16, the wireless transmission channel 410 of IEEE802.11ad is schematically illustrated with a rectangular dotted line, and the wireless transmission channel 420 of IEEE802.11n is schematically illustrated with a rectangular dotted line, in the same way as FIG. 11. Also, in FIG. 16, each port is schematically illustrated in the same way as FIG. 11. Specifically, a TCP port #1 (441), a TCP port #2 (442), a UDP port #1 (443), a UDP port #2 (444), a UDP port #3 (445), and a UDP port #4 (446) are illustrated as each port.

Also, FIG. 16 illustrates an example in which the stream on the wireless transmission channel 410 of IEEE802.11ad and the stream on the wireless transmission channel 420 of IEEE802.11n are managed with different RTSP sessions, but only one TCP session for RTSP is generated.

[Change Example of Message]

FIG. 17 is a diagram illustrating a change example of the messages exchanged by the devices that configure the communication system 10 in the second embodiment of the present technology. That is, change examples of the messages (the M4 request message, the M6 request message, and the M7 response message) when different URLs are used for respective RTSP sessions are illustrated.

Also, in FIG. 17, additional parts or changed parts are illustrated and surrounded by rectangles 521 to 527 of dotted lines.

[Sequence Chart Example]

FIG. 18 is a sequence chart illustrating an exemplary communication process between the devices that configure the communication system 10 in the second embodiment of the present technology. Note that FIG. 18 illustrates an exemplary communication process for exchanging the M1 to M7 messages (including the messages illustrated in FIG. 17)

between the information processing apparatus 100 and the information processing apparatus 200.

In the example illustrated in FIG. 18, the messages illustrated in FIG. 13 a and FIG. 14 a are messages corresponding to the arrow 611. Also, the messages illustrated in FIG. 17 are messages corresponding to the arrow 612. Also, the messages illustrated in b of FIG. 17 are messages corresponding to the arrows 613, 615. Also, the messages illustrated in c of FIG. 17 are messages corresponding to the arrows 617, 618.

First, in the same way as the example illustrated in FIGS. 12 to 15, the M3 response message and the M4 request message are changed. Also, the receiver device includes the UDP port number of each wireless transmission channel for receiving the image data and the sound data, into each message. When the content protection mechanism is used, the M3 response message is also changed, in the same way as the example illustrated in FIGS. 12 to 15.

Also, in order to generate two RTSP sessions, each of the M6 request message, the M6 response message, the M7 request message, and the M7 response message 2 is transmitted and received twice. Note that, when the wireless transmission channels are three or more, it is repeated according to the number of wireless transmission channels.

Also, the correspondence relationship between RTSP session and wireless transmission channel may be defined in advance, and the corresponding wireless transmission channel may be declared in the parameter field of the M6 request message. Alternatively, the corresponding wireless transmission channel can be designated by using different URLs included in the M6 request message and the M7 request message in each RTSP session. In this case, the URL included in the M4 request message (WFD-presentation—the URL parameter) needs to be included according to the number of corresponding wireless transmission channels. Also, the URL of the M8 request message and the M9 request message transmitted thereafter needs to be changed in the same way. Change examples of the M4 request message, the M6 request message, and the M7 request message in this case are illustrated in FIG. 17 a to c.

Also, with respect to the RTSP control command, each transmission on the wireless transmission channel 410 of IEEE802.11ad and on the wireless transmission channel 420 of IEEE802.11n may be controlled separately, and may be operated in conjunction with each other, in the same way as the example illustrated in FIG. 11.

As described above, the information processing apparatus 100 transmits multiple data to the information processing apparatus 200, by using both of the wireless transmission channel of the high frequency band and the wireless transmission channel of the low frequency band. In this case, the control units 180, 280 generates one TCP session on the wireless transmission channel of the low frequency band, and generates a plurality of RTSP sessions for transmitting multiple data on the TCP session. Also, when generating a plurality of RTSP sessions, the control unit 180 includes the URL included in the M4 request message according to the number of the RTSP sessions. Also, when generating a plurality of RTSP sessions, the control unit 180 exchanges the M6 message and the M7 message according to the number of RTSP sessions.

Although, in the second embodiment of the present technology, an example in which one wireless transmission channel is added has been illustrated as the message change method, it may be applied in a case in which two or more wireless transmission channels are added. As described above, when two or more wireless transmission channels are added, each value is added by the above change method, for example. For example, when each value is added with a separating comma, each of two or more values is sequentially added with a separating comma.

Here, it is assumed that the transmission of the image data is switched from a certain wireless transmission channel to another wireless transmission channel, in each example illustrated in the second embodiment of the present technology. In this case, it is conceived that the switch is announced in advance from the transmitter device to the receiver device by using the RTSP message. For example, a SET_PARAMETER request message is used, and necessary information (for example, a timing to switch, designation of wireless transmission channel, and a format of video before and after switch) are written in the parameter field. Then, the message is transmitted from the transmitter device to the receiver device.

Also, for example, the announcement may be performed by using a trigger PAUSE command and a trigger PLAY command. For example, after additional information is input into the parameter field if necessary, it may be announced that the data whose transmission is stopped by the switch is subjected to "temporary stop" and that the data transmitted after the switch is subjected to "reproduction".

Note that this announcement may be omitted, when an advance announcement is unnecessary at the time of switch at the receiver device side.

As described above, according to the second embodiment of the present technology, even when different IP addresses are used for respective wireless transmission channels, an appropriate data transmission utilizing a plurality of types of wireless transmission channels is achieved by using an existing device of Wi-Fi certified miracast.

As described above, in the embodiment of the present technology, a plurality of transmission methods are combined in the transmission of the image data and the sound data using the wireless communication. Thereby, transmission of high quality images is enabled, and interruption of sound and disconnection of sessions in the middle are prevented, and deterioration of user experience is prevented. That is, an appropriate data transmission control is performed, and the feeling of strangeness given to a user is reduced, and user experience is improved.

3. Application Example

The technology according to the disclosure can be applied to various products. For example, the information processing apparatuses 100 and 200 may be realized as mobile terminals such as smartphones, tablet PCs (Personal Computers), notebook PCs, portable game terminals, or digital cameras, fixed-type terminals such as television receivers, printers, digital scanners, or network storages, or car-mounted terminals such as car navigation devices. In addition, the information processing apparatuses 100 and 200 may be realized as terminals that perform M2M (Machine to Machine) communication (also referred to as MTC (Machine Type Communication) terminals) such as smart meters, vending machines, remotely controlled surveillance devices, or POS (Point Of Sale) terminals. Furthermore, the information processing apparatuses 100 and 200 may be wireless communication modules mounted in such terminals (for example, integrated circuit modules configured by one die).

3-1. First Application Example

Figure 19:
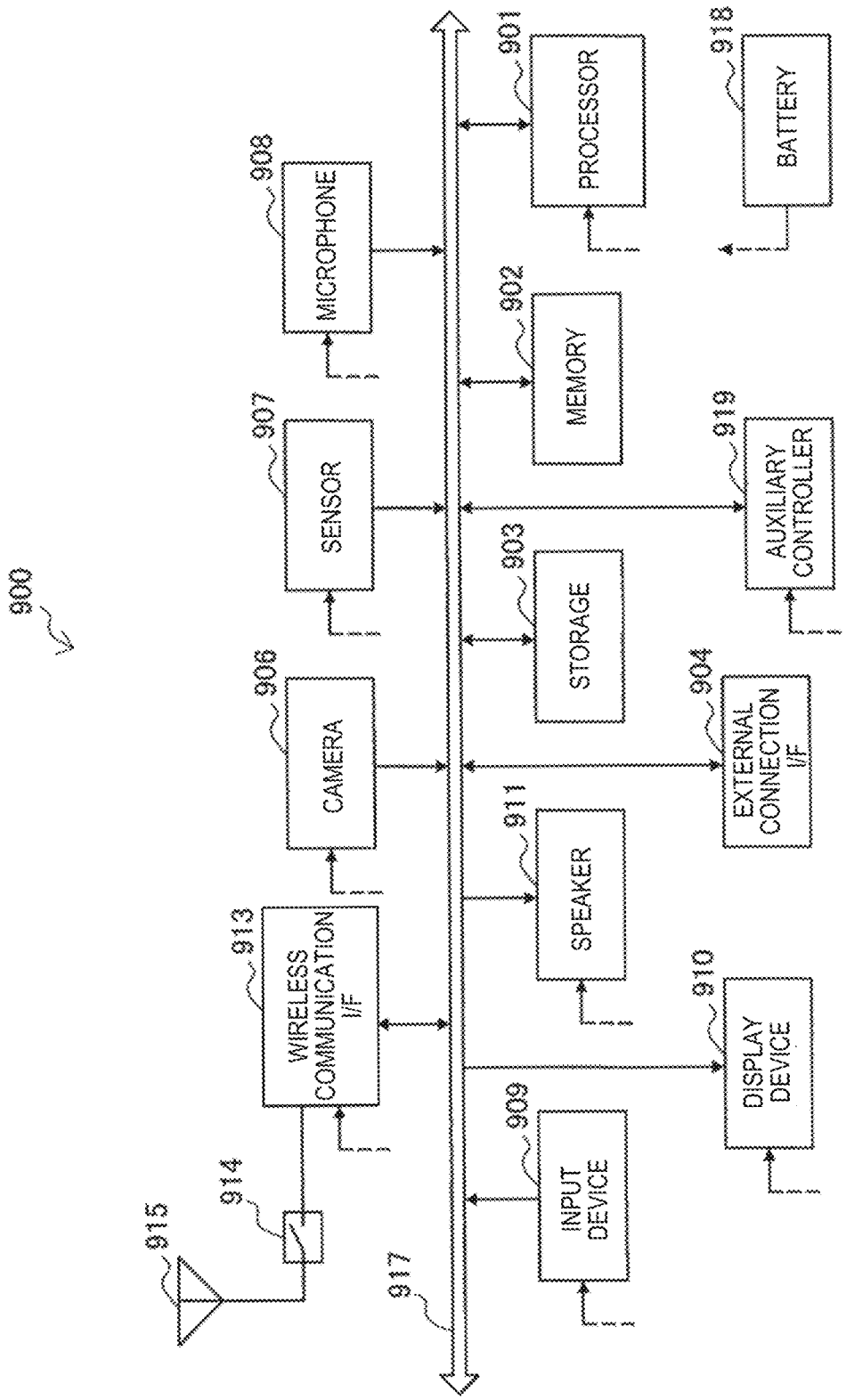
FIG. 19 is a block diagram showing an example of a schematic configuration of a smartphone.

FIG. 19 is a block diagram showing an example of a schematic configuration of a smartphone 900 to which an embodiment of the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing Unit) or an SoC (System on Chip), and controls functions of an application layer and other layers of the smartphone 900. The memory 902 includes a RAM (Random Access Memory) and a ROM (Read Only Memory), and stores programs executed by the processor 901 and data. The storage 903 can include a storage medium such as a semiconductor memory or a hard disk. The externally connected interface 904 is an interface for connecting an externally attached device such as a memory card or a USB (Universal Serial Bus) device to the smartphone 900.

The camera 906 has an image sensor, for example, a CCD (Charge Coupled Device) or a CMOS (Complementary Metal Oxide Semiconductor), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to execute the wireless LAN communication. The wireless communication interface 913 can communicate with another device via a wireless LAN access point in an infrastructure mode. In addition, the wireless communication interface 913 can directly communicate with another device in an ad hoc mode. The wireless communication interface 913 can typically include a baseband processor, an RF (Radio Frequency) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 19.

In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 19 via power supply lines partially indicated by dashed lines in the drawing. The auxiliary controller 919 causes, for example, minimum necessary functions of the smartphone 900 to be operated in a sleep mode.

In the smartphone 900 illustrated in FIG. 19, the first communication unit 130, the second communication unit 160, the control signal transmitting and receiving unit 170, and the control unit 180, which are described by using FIG. 2, may be implemented in the wireless communication interface 913. Also, in the smartphone 900 illustrated in FIG. 19, the first communication unit 210, the second communication unit 240, the control signal transmitting and receiving unit 270, and the control unit 280, which are described by using FIG. 3, may be implemented in the wireless communication interface 913. Also, at least a part of these functions may be implemented in the processor 901 or the auxiliary controller 919.

3-2. Second Application Example

Figure 20:
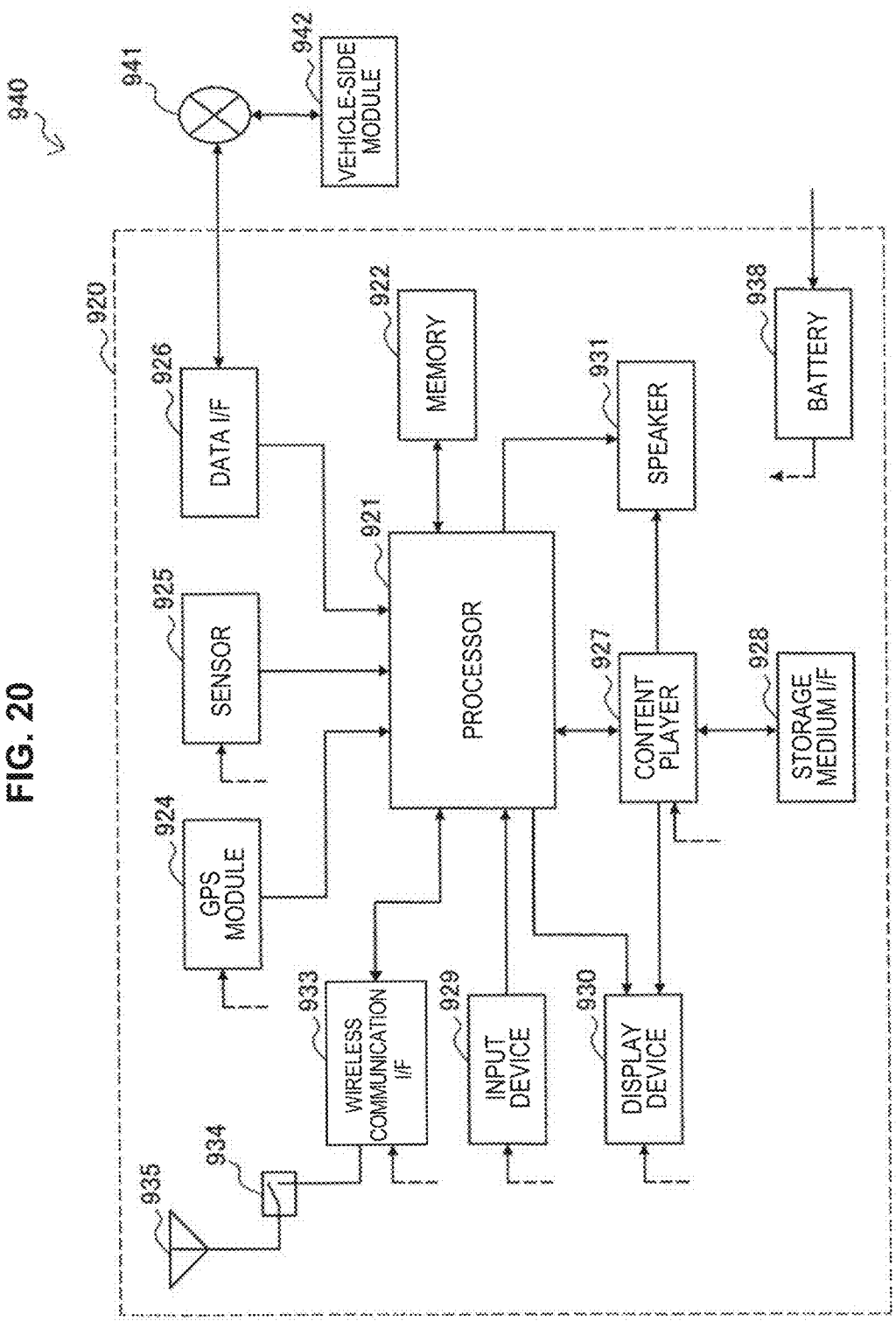
FIG. 20 is a block diagram showing an example of a schematic configuration of a car navigation device.

FIG. 20 is a block diagram showing an example of a schematic configuration of a car navigation device 920 to which an embodiment of the technology of the present disclosure can be applied. The car navigation device 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes a RAM and a ROM storing programs executed by the processor 921 and data.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a pneumatic sensor, and the like. The data interface 926 is connected to a car-mounted network 941 via, for example, a terminal that is not shown to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad, to execute wireless LAN communication. The wireless communication interface 933 can communicate with another device via a wireless LAN access point in the infrastructure mode. In addition, the wireless communication interface 933 can directly communicate with another device in an ad hoc mode. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation device 920 may include a plurality of antennas, without being limited to the example of FIG. 20. In this case, the antenna switch 934 may be omitted from the configuration of the car navigation device 920.

The battery 938 supplies electric power to each of the blocks of the car navigation device 920 shown in FIG. 20 via power supply lines partially indicated by dashed lines in the drawing. In addition, the battery 938 accumulates electric power supplied from the vehicle.

In the car navigation device 920 illustrated in FIG. 20, the first communication unit 130, the second communication unit 160, the control signal transmitting and receiving unit 170, and the control unit 180, which are described by using FIG. 2, may be implemented in the wireless communication interface 933. In the car navigation device 920 illustrated in FIG. 20, the first communication unit 210, the second communication unit 240, the control signal transmitting and receiving unit 270, and the control unit 280, which are described by using FIG. 3, may be implemented in the wireless communication interface 933. Also, at least a part of these functions may be implemented in the processor 921.

An embodiment of the technology of the present disclosure may be realized as an in-vehicle system (or a vehicle) 940 including one or more blocks of the above-described car navigation device 920, an in-vehicle network 941, and a vehicle-side module 942. The vehicle-side module 942 generates vehicle-side data such as a vehicle speed, the number of engine rotations, or failure information and outputs the generated data to the in-vehicle network 941.

The above-described embodiments are examples for embodying the present technology, and matters in the embodiments each have a corresponding relationship with subject matter in the claims. Likewise, the matters in the embodiments and the subject matter in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a sequence of sequences or may be handled as a program for causing a computer to execute the sequence of sequences and recording medium storing the program. As the recording medium, a CD (Compact Disc), an MD (MiniDisc), and a DVD (Digital Versatile Disk), a memory card, and a Blu-ray disc (registered trademark) can be used.

In addition, the effects described in the present specification are not limiting but are merely examples, and there may be additional effects.

Additionally, the present technology may also be configured as below.

(1)

An information processing apparatus that performs data transmission by using at least one of a wireless transmission channel of a high frequency band and a wireless transmission channel of a low frequency band, and performs real time image transmission with another information processing apparatus in accordance with a wireless fidelity (Wi-Fi) certified miracast specification, the information processing apparatus including:

a control unit configured to perform a control to transmit a control signal relevant to Wi-Fi certified miracast to the other information processing apparatus, by using the wireless transmission channel of the low frequency band.

(2)

The information processing apparatus according to (1), wherein the control unit transmits data of a low degree of importance to the other information processing apparatus by using the wireless transmission channel of the high frequency band, and transmits data of a high degree of importance to the other information processing apparatus by using the wireless transmission channel of the low frequency band.

(3)

The information processing apparatus according to (2), wherein the control unit transmits image data as the data of the low degree of importance, and transmits sound data as the data of the high degree of importance.

(4)

The information processing apparatus according to (3), wherein when a communication quality of the wireless transmission channel of the high frequency band becomes lower than a threshold, the control unit switches the wireless transmission channel of the image data from the wireless transmission channel of the high frequency band to the wireless transmission channel of the low frequency band.

(5)

The information processing apparatus according to (4), wherein when switching the wireless transmission channel, the control unit performs at least one of changing an encoding method of the image data, switching between use and non-use of a highly efficient encoding, and changing a type and a setting item of the highly efficient encoding.

(6)

The information processing apparatus according to (4) or (5), wherein the control unit encodes image data transmitted after switching the wireless transmission channel, in a decodable manner that does not depend on image data transmitted before switching the wireless transmission channel, and transmits the encoded image data to the other information processing apparatus.

(7)

The information processing apparatus according to (1), wherein the control unit simultaneously transmits image data for outputting a same image to the other information processing apparatus, by using both of the wireless transmission channel of the high frequency band and the wireless transmission channel of the low frequency band.

(8)

The information processing apparatus according to (1), wherein the control unit selects a wireless transmission channel for use in transmission of the data from among a plurality of wireless transmission channels, on the basis of characteristics of the plurality of wireless transmission channels and information relevant to transmission target data.

(9)

The information processing apparatus according to any of (1) to (8), wherein when transmitting multiple data to the other information processing apparatus by using both of the wireless transmission channel of the high frequency band and the wireless transmission channel of the low frequency band, the control unit generates a plurality of transmission control protocol (TCP) sessions on the wireless transmission channel of the low frequency band, and generates a plurality of real time streaming protocol (RTSP) sessions for transmitting the multiple data on each of the TCP sessions.

(10)

The information processing apparatus according to any of (1) to (8), wherein when transmitting multiple data to the other information processing apparatus by using both of the wireless transmission channel of the high frequency band and the wireless transmission channel of the low frequency band, the control unit generates one TCP session on the wireless transmission channel of the low frequency band, and generates one RTSP session for transmitting the multiple data on the TCP session.

(11)

The information processing apparatus according to (10), wherein when generating the one RTSP session, the control unit additionally writes a port number relevant to the wireless transmission channel for use in transmission of the multiple data, by separating an RTSP message with one of a comma, a colon, a semicolon, a period, a + symbol, a slash, and a space.

(12)

The information processing apparatus according to (11), wherein when the other information processing apparatus complies with a real-time transport control protocol (RTCP), the control unit writes two consecutive values separated with a hyphen as user datagram protocol (UDP) port numbers with respect to client_por in an M6 request message and an M6 response message and server_port in an M6 response message, and associates a first value with a real-time transport protocol (RTP), and associates a second value with the RTCP.

(13)

The information processing apparatus according to any of (1) to (8), wherein when transmitting multiple data to the other information processing apparatus by using both of the wireless transmission channel of the high frequency band and the wireless transmission channel of the low frequency band, the control unit generates one TCP session on the wireless transmission channel of the low frequency band, and generates a plurality of RTSP sessions for transmitting the multiple data on the TCP session.

(14)

The information processing apparatus according to (13), wherein when generating the plurality of RTSP sessions, the control unit includes a URL included in an M4 request message, according to the number of the RTSP sessions.

(15)

The information processing apparatus according to (13) or (14), wherein when generating the plurality of RTSP sessions, the control unit exchanges an M6 message and an M7 message, according to the number of the RTSP sessions.

(16)

The information processing apparatus according to any of (9) to (15), wherein different IP addresses are used for the wireless transmission channel of the high frequency band and the wireless transmission channel of the low frequency band.

(17)

An information processing apparatus that performs data transmission by using at least one of a wireless transmission channel of a high frequency band and a wireless transmission channel of a low frequency band, and performs real time image transmission with another information processing apparatus in accordance with a Wi-Fi certified miracast specification, the information processing apparatus including:

a control unit configured to perform a control to receive a control signal relevant to Wi-Fi certified miracast from the other information processing apparatus by using the wireless transmission channel of the low frequency band.

(18)

The information processing apparatus according to (17), wherein when simultaneously receiving multiple image data for outputting a same image from the other information processing apparatus by using both of the wireless transmission channel of the high frequency band and the wireless transmission channel of the low frequency band, the control unit selects high quality image data as output target image data from among the received multiple image data.

(19)

A communication method for performing data transmission by using at least one of a wireless transmission channel of a high frequency band and a wireless transmission channel of a low frequency band, and performing real time image transmission between a plurality of information processing apparatuses in accordance with a Wi-Fi certified miracast specification, the communication method including:

transmitting a control signal relevant to Wi-Fi certified miracast by using the wireless transmission channel of the low frequency band.

(20)

A program that causes a computer of an information processing apparatus that performs data transmission by using at least one of a wireless transmission channel of a high frequency band and a wireless transmission channel of a low frequency band, and performs real time image transmission with another information processing apparatus in accordance with a Wi-Fi certified miracast specification, to execute:

a control to transmit a control signal relevant to Wi-Fi certified miracast to the other information processing apparatus by using the wireless transmission channel of the low frequency band.

REFERENCE SIGNS LIST 10 communication system
100 information processing apparatus
101 touch panel
110 image generation unit
120 image encoding unit
130 first communication unit
131 antenna
140 sound generation unit
150 sound encoding unit
160 second communication unit
161 antenna
170 control signal transmitting and receiving unit
180 control unit
200 information processing apparatus
210 first communication unit
211 antenna
220 image decoding unit
230 image output unit
240 second communication unit
241 antenna
250 sound decoding unit
260 sound output unit
270 control signal transmitting and receiving unit
280 control unit
900 smartphone
901 processor
902 memory
903 storage
904 externally connected interface
906 camera
907 sensor
908 microphone
909 input device
910 display device
911 speaker
913 wireless communication interface
914 antenna switch
915 antenna
917 bus
918 battery
919 auxiliary controller
920 car navigation device
921 processor
922 memory
924 GPS module
925 sensor
926 data interface
927 content player
928 storage medium interface
929 input device
930 display device
931 speaker
933 wireless communication interface
934 antenna switch
935 antenna
938 battery
941 in-vehicle network
942 vehicle-side module

The invention claimed is:

1. An information processing apparatus that performs data transmission by using at least one of a wireless transmission channel of a high frequency band and a wireless transmission channel of a low frequency band, and performs real time image transmission with another information processing apparatus in accordance with a wireless fidelity (Wi-Fi) certified miracast specification, the information processing apparatus comprising:
a control unit configured to perform a control to transmit a control signal relevant to Wi-Fi certified miracast to the other information processing apparatus, by using the wireless transmission channel of the low frequency band,
wherein when transmitting multiple data to the other information processing apparatus by using both of the wireless transmission channel of the high frequency band and the wireless transmission channel of the low frequency band, the control unit generates one TCP session on the wireless transmission channel of the low frequency band, and generates a plurality of RTSP sessions for transmitting the multiple data on the TCP session,
wherein different IP addresses are used for the wireless transmission channel of the high frequency band and the wireless transmission channel of the low frequency band,
wherein transmission of data using the channel of the high frequency band is controlled by one of the RTSP sessions and transmission of data using the channel of the low frequency band is controlled by another of the RTSP sessions.

2. The information processing apparatus according to claim 1, wherein the control unit transmits data of a low degree of importance to the other information processing apparatus by using the wireless transmission channel of the high frequency band, and transmits data of a high degree of importance to the other information processing apparatus by using the wireless transmission channel of the low frequency band.

3. The information processing apparatus according to claim 2, wherein the control unit transmits image data as the data of the low degree of importance, and transmits sound data as the data of the high degree of importance.

4. The information processing apparatus according to claim 3, wherein
when a communication quality of the wireless transmission channel of the high frequency band becomes lower than a threshold, the control unit switches the wireless transmission channel of the image data from the wireless transmission channel of the high frequency band to the wireless transmission channel of the low frequency band.

5. The information processing apparatus according to claim 4, wherein
when switching the wireless transmission channel, the control unit performs at least one of changing an encoding method of the image data, switching between use and non-use of a highly efficient encoding, and changing a type and a setting item of the highly efficient encoding.

6. The information processing apparatus according to claim 4, wherein
the control unit encodes image data transmitted after switching the wireless transmission channel, in a decodable manner that does not depend on image data transmitted before switching the wireless transmission channel, and transmits the encoded image data to the other information processing apparatus.

7. The information processing apparatus according to claim 1, wherein
the control unit simultaneously transmits image data for outputting a same image to the other information processing apparatus, by using both of the wireless transmission channel of the high frequency band and the wireless transmission channel of the low frequency band.

8. The information processing apparatus according to claim 1, wherein
the control unit selects a wireless transmission channel for use in transmission of the data from among a plurality of wireless transmission channels, on the basis of characteristics of the plurality of wireless transmission channels and information relevant to transmission target data.

9. The information processing apparatus according to claim 1, wherein
when transmitting multiple data to the other information processing apparatus by using both of the wireless transmission channel of the high frequency band and the wireless transmission channel of the low frequency band, the control unit generates a plurality of transmission control protocol (TCP) sessions on the wireless transmission channel of the low frequency band, and generates a plurality of real time streaming protocol (RTSP) sessions for transmitting the multiple data on each of the TCP sessions.

10. The information processing apparatus according to claim 1, wherein
when transmitting multiple data to the other information processing apparatus by using both of the wireless transmission channel of the high frequency band and the wireless transmission channel of the low frequency band, the control unit generates one TCP session on the wireless transmission channel of the low frequency band, and generates one RTSP session for transmitting the multiple data on the TCP session.

11. The information processing apparatus according to claim 10, wherein
when generating the one RTSP session, the control unit additionally writes a port number relevant to the wireless transmission channel for use in transmission of the multiple data, by separating an RTSP message with one of a comma, a colon, a semicolon, a period, a + symbol, a slash, and a space.

12. The information processing apparatus according to claim 11, wherein
when the other information processing apparatus complies with a real-time transport control protocol (RTCP), the control unit writes two consecutive values separated with a hyphen as user datagram protocol (UDP) port numbers with respect to client_port in a first request message and a first response message and server_port in a first response message, and associates a first value with a real-time transport protocol (RTP), and associates a second value with the RTCP.

13. The information processing apparatus according to claim 1, wherein
when generating the plurality of RTSP sessions, the control unit includes a URL included in a second request message, according to the number of the RTSP sessions.

14. The information processing apparatus according to claim 1, wherein
when generating the plurality of RTSP sessions, the control unit exchanges a first message and a third message, according to the number of the RTSP sessions.

15. An information processing apparatus that performs data transmission by using at least one of a wireless transmission channel of a high frequency band and a wireless transmission channel of a low frequency band, and performs real time image transmission with another information processing apparatus in accordance with a Wi-Fi certified miracast specification, the information processing apparatus comprising:
a control unit configured to perform a control to receive a control signal relevant to Wi-Fi certified miracast from the other information processing apparatus by using the wireless transmission channel of the low frequency band,
wherein when receiving multiple data from the other information processing apparatus by using both of the wireless transmission channel of the high frequency band and the wireless transmission channel of the low frequency band, the control unit generates one or more TCP sessions on the wireless transmission channel of the low frequency band, and generates a plurality of RTSP sessions for receiving the multiple data on the TCP sessions,
wherein different IP addresses are used for the wireless transmission channel of the high frequency band and the wireless transmission channel of the low frequency band,
wherein reception of data using the channel of the high frequency band is controlled by one of the RTSP sessions and reception of data using the channel of the low frequency band is controlled by another of the RTSP sessions.

16. The information processing apparatus according to claim 15, wherein
when simultaneously receiving multiple image data for outputting a same image from the other information processing apparatus by using both of the wireless transmission channel of the high frequency band and the wireless transmission channel of the low frequency band, the control unit selects high quality image data as output target image data from among the received multiple image data.

17. A communication method for performing data transmission by using at least one of a wireless transmission channel of a high frequency band and a wireless transmission channel of a low frequency band, and performing real time image transmission between a plurality of information processing apparatuses in accordance with a Wi-Fi certified miracast specification, the communication method comprising:
transmitting a control signal relevant to Wi-Fi certified miracast by using the wireless transmission channel of the low frequency band, and
when transmitting multiple data to a second information processing apparatus by using both of the wireless transmission channel of the high frequency band and the wireless transmission channel of the low frequency band, a control unit of a first information processing apparatus generates one TCP session on the wireless transmission channel of the low frequency band, and generates a plurality of RTSP sessions for transmitting the multiple data on the TCP session,
wherein different IP addresses are used for the wireless transmission channel of the high frequency band and the wireless transmission channel of the low frequency band, and
wherein transmission of data using the channel of the high frequency band is controlled by one of the RTSP sessions and transmission of data using the channel of the low frequency band is controlled by another of the RTSP sessions.

18. A non-transitory computer readable storage medium storing a program that causes a computer of an information processing apparatus that performs data transmission by using at least one of a wireless transmission channel of a high frequency band and a wireless transmission channel of a low frequency band, and performs real time image transmission with another information processing apparatus in accordance with a Wi-Fi certified miracast specification, to execute:
- a control to transmit a control signal relevant to Wi-Fi certified miracast to the other information processing apparatus by using the wireless transmission channel of the low frequency band,
wherein when transmitting multiple data to the other information processing apparatus by using both of the wireless transmission channel of the high frequency band and the wireless transmission channel of the low frequency band, the control generates one TCP session on the wireless transmission channel of the low frequency band, and generates a plurality of RTSP sessions for transmitting the multiple data on the TCP session,
wherein different IP addresses are used for the wireless transmission channel of the high frequency band and the wireless transmission channel of the low frequency band,
wherein transmission of data using the channel of the high frequency band is controlled by one of the RTSP sessions and transmission of data using the channel of the low frequency band is controlled by another of the RTSP sessions.

* * * * *